United States Patent
Bae et al.

(10) Patent No.: US 7,441,721 B2
(45) Date of Patent: Oct. 28, 2008

(54) DEVICE FOR PREVENTING WELDING WIRE FROM TANGLING

(75) Inventors: Hyo-Young Bae, Pohang-si (KR);
Yo-Seong Lee, Pohang-si (KR);
Sae-Youl Ryu, Pohang-si (KR);
Sang-Ho Choi, Pohang-si (KR);
Myung-Sang Yun, Pohang-si (KR);
Yong-Chul Seo, Pohang-si (KR);
Jung-Ho Jung, Pohang-si (KR);
Seok-Hwan Kim, Pohang-si (KR)

(73) Assignee: Hyundai Welding Co., Ltd. (KR)

( * ) Notice: Subject to any disclaimer, the term of this patent is extended or adjusted under 35 U.S.C. 154(b) by 469 days.

(21) Appl. No.: 10/517,997

(22) PCT Filed: Jun. 17, 2002

(86) PCT No.: PCT/KR02/01136

§ 371 (c)(1),
(2), (4) Date: Jun. 29, 2005

(87) PCT Pub. No.: WO03/106096

PCT Pub. Date: Dec. 24, 2003

(65) Prior Publication Data

US 2006/0027699 A1 Feb. 9, 2006

(51) Int. Cl.
*B65H 59/06* (2006.01)
*B65H 57/18* (2006.01)

(52) U.S. Cl. .................. 242/128; 242/588.6; 242/566; 242/593; 206/395

(58) Field of Classification Search .............. 242/588, 242/588.3, 588.6, 160.4, 128, 419, 560, 566, 242/593, 171, 146, 597, 597.1; 206/398, 206/399

See application file for complete search history.

(56) References Cited

U.S. PATENT DOCUMENTS

| 2,390,157 | A | * | 12/1945 | Kramer | 242/128 |
|---|---|---|---|---|---|
| 2,390,158 | A | * | 12/1945 | Kramer | 242/128 |
| 2,957,643 | A | * | 10/1960 | Bosworth et al. | 242/128 |
| 3,202,380 | A | * | 8/1965 | Hosbein | 242/128 |
| 3,203,642 | A | * | 8/1965 | Hirst | 242/128 |
| 3,863,861 | A | * | 2/1975 | Bellasio | 242/128 |
| 3,995,786 | A | * | 12/1976 | Deniega | 242/365.4 |
| 4,017,037 | A | * | 4/1977 | Kovaleski | 242/129.8 |
| 4,062,505 | A | * | 12/1977 | Kovaleski | 242/128 |
| 4,334,653 | A | * | 6/1982 | Whellams | 242/129.8 |
| 4,508,290 | A | * | 4/1985 | Bauer | 242/128 |
| 5,277,314 | A | * | 1/1994 | Cooper et al. | 206/398 |
| 5,806,780 | A | * | 9/1998 | Schneider et al. | 242/419 |
| 6,409,116 | B1 | * | 6/2002 | Brown | 242/419.1 |
| 7,147,176 | B2 | * | 12/2006 | Rexhaj | 242/128 |

FOREIGN PATENT DOCUMENTS

| JP | 58183570 A | 10/1983 |
|---|---|---|
| JP | 61-183057 A | 8/1986 |
| JP | 62-158571 A | 7/1987 |

(Continued)

*Primary Examiner*—Evan H Langdon
(74) *Attorney, Agent, or Firm*—The Webb Law Firm, P.C.

(57) ABSTRACT

Disclosed is a welding wire tangling-prevention device for preventing tangling of a welding wire received in a large-capacity pail pack in the form of a vertically-extending tube-shaped wound body including eccentrically-stacked continuous spiral loops, when the welding wire is drawn out from the pail pack. The device includes a ring member laid on the top surface of the tube-shaped wound body, the ring member including an outer ring having an outer diameter smaller than the inner diameter of the pail pack, and an inner ring having an outer diameter smaller than the inner diameter of the outer ring, a plurality of comb teeth extending from an inner circumferential surface of the outer ring toward the inner ring, and a plurality of comb teeth extending from an outer circumferential surface of the inner ring toward the outer ring, whereby the welding wire is drawn out between the outer and inner rings.

4 Claims, 17 Drawing Sheets

FOREIGN PATENT DOCUMENTS

| | | | | |
|---|---|---|---|---|
| JP | 02147566 A | * | 6/1990 | |
| JP | 03120165 A | * | 5/1991 | |
| JP | 4-133973 A | | 5/1992 | |
| JP | 8-40642 A | | 2/1996 | |
| JP | 3038549 U | | 4/1997 | |
| JP | 9-156827 A | | 6/1997 | |
| JP | 11060067 A | | 3/1999 | |
| JP | 11-192552 A | | 7/1999 | |
| JP | 2001302096 A | | 10/2001 | |
| KR | 87-01076 A | | 6/1987 | |
| KR | 91-05819 Y | | 8/1991 | |
| KR | 92-16429 U | | 9/1992 | |
| KR | 92-21073 U | | 12/1992 | |
| KR | 95-0000483 Y1 | | 1/1995 | |

* cited by examiner

DEVICE FOR PREVENTING WELDING WIRE FROM TANGLING

BACKGROUND OF THE INVENTION

1. Field of the Invention

The present invention relates to a welding wire tangling-prevention device for a welding wire received in a large-capacity pail pack in the form of a tube-shaped wound body including eccentrically-stacked continuous spiral loops. More particularly, the present invention relates to a welding wire tangling-prevention device for a welding wire received in a large-capacity pail pack in the form of a tube-shaped wound body including eccentrically-stacked continuous spiral loops, provided with means for controlling the welding wire to be freely drawn out between alternating comb teeth while preventing subsequent loops of the welding wire from being lifted and tangled.

2. Background Art

In order to prevent tangling of a welding wire received in a large-capacity pail pack in the form of a tube-shaped wound body including eccentrically-stacked continuous spiral loops, various drawing devices have been proposed. These drawing devices use an annular member laid on the top of the tube-shaped wound body to allow the welding wire to be drawn out via the inside or outside of the annular member.

Examples of the drawing device adapted to draw out the welding wire via the inside of the annular member are disclosed in Korean Patent Publication No. 87-1076, Japanese Patent Laid-Open Publication No. Sho. 61-183057 and Japanese Patent Laid-Open Publication No. Hei. 11-192552. When an uppermost loop of the welding wire is drawn out while being loosened, a subsequent loop of the welding wire may be gradually increased in diameter due to the elasticity of the welding wire, so that it protrudes between the outer surface of the drawing device and the inner surface of the pail pack.

Korean Patent Publication No. 87-1076 discloses an annular member having buffering wings for preventing the welding wire from protruding between the outer surface of the annular member and the inner surface of the pail pack while allowing the welding wire to be freely lowered along the inner surface of the pail pack as the welding wire is consumed. Japanese Patent Laid-open Publication No. Sho. 61-183057 discloses a vertical strip attached to the inner surface of the pail pack to prevent the welding wire from protruding between the outer surface of the annular member and the inner surface of the pail pack while allowing the welding wire to be freely lowered along the strip. As the welding wire is freely lowered along the strip, no space is formed between the top of the wound body and the annular member, so that it is possible to prevent tangling of the welding wire. In particular, Japanese Patent Laid-open Publication No. Sho. 61-183057 takes into consideration the tendency of the welding wire to be lifted via the outside of the annular member, which thereby causes tangling of the welding wire. However, the conventional drawing devices configured to draw out the welding wire via the inside of the annular member frequently involve the problem that when the uppermost loop of the welding wire is drawn out, subsequent loops of the welding wire are drawn out by the uppermost loop, so that the welding wire becomes tangled. In order to solve this problem, Korean Utility Model Publication No. 91-5819 and Japanese Patent Publication No. Hei. 4-133973 have proposed use of a weight adapted to be laid on the annular member because the above-mentioned problem was considered to be caused by an insufficient weight of the annular member. However, it is impossible for this technique to effectively control the subsequent loops of the welding wire drawn out by the uppermost loop of the welding wire.

In particular, Japanese Patent Laid-open Publication No. Hei. 11-192552 discloses a proposal in which the annular member has a reduced drawing hole so as to control the subsequent loops of the welding wire drawn out by the uppermost loop of the welding wire. However, this technique cannot effectively control the subsequent loops of the welding wire, because the subsequent loops may be jammed in the reduced-size drawing hole, thereby frequently stopping the welding process.

Examples of the drawing device adapted to draw out the welding wire via the outside of the annular member are disclosed in Japanese Patent Laid-open Publication Nos. Hei. 8-40642 and Hei. 9-156827. Similarly to Korean Patent Publication No. 87-1076, Japanese Patent Laid-open Publication No. Hei. 8-40642 discloses an annular member having buffering wings for allowing the welding wire to be freely lowered along the inner surface of the pail pack as the welding wire is consumed. Since the buffering wings are made of a soft material, the welding wire is allowed to be drawn out between the inner surface of the pail pack and the buffering wings. Although this technique can to some extent prevent the subsequent loops of the welding wire from being drawn out by the uppermost loop of the welding wire, other problems may occur. That is, the welding wire may be caught by the buffering wings so that its drawing resistance may be increased. In severe cases, the annular member may be drawn out along with the welding wire.

In order to solve this problem, Japanese Patent Laid-open Publication No. Hei. 9-156827 has proposed an improved buffering wing. However, this technique cannot fully solve the above described problem In the above-mentioned drawing devices adapted to draw out the welding wire via the outside of the annular member, there is another problem in that a subsequent welding wire loop may frequently be tangled while being moved downward into a space centrally defined in the vertical wound body during the drawing of an uppermost loop of the welding wire.

Other conventional tangling-prevention devices are disclosed in Korean Utility Model Laid-open Publication Nos. 92-16429 and 92-21073, and Korean Utility Model Publication No. 95-483.

Korean Utility Model Laid-open Publication No. 92-16429 discloses a tangling-prevention device including a main annular member adapted to be laid on the top of a tube-shaped wound welding wire body, and an additional annular member with a reduced size to be laid on the main annular member around the central opening of the main annular member, thereby allowing the welding wire to be drawn out between the annular members. However, this tangling-prevention device cannot solve the problem where the subsequent loops of the welding wire are undesirably drawn out. That is, this technique has the same problem as that of Japanese Patent Laid-open Publication No. Hei. 8-40642.

Korean Utility Model Laid-open Publication No. 92-21073 discloses an annular member having engagement steps. However, it is also difficult for this technique to prevent the subsequent loops of the welding wire from tangling.

In order to prevent the subsequent loops of the welding wire from being tangled, Korean Utility Model Publication No. 95-483 discloses a tangling-prevention device including an annular member with a small size to be laid on the top of a tube-shaped wound welding wire body around the central hole of the wound welding wire body, and another annular member provided at its inner surface with buffering wings. In this tangling-prevention device, the welding wire is drawn out between the small-size annular member and the annular member provided with the buffering wings. Although the buffering wings more or less effectively serve to prevent the subsequent loops of the welding wire from being drawn out by the uppermost loop of the welding wire, it is impossible to completely prevent such undesirable drawing of the subsequent welding wire loops. Furthermore, there is a problem in that since there is a space between the buffering wings and the top of the wound welding wire body, the loops of the welding wire may be lifted in the space, so that they may become tangled.

SUMMARY OF THE INVENTION

Therefore, the present invention has been made in view of the above-mentioned problems involved with the prior art, and an object of the invention is to provide a welding wire tangling-prevention device for a welding wire received in a large-capacity pail pack in the form of a tube-shaped wound body including eccentrically-stacked continuous spiral loops, provided with means for controlling the welding wire to be freely drawn out among alternating comb teeth while preventing subsequent loops of the welding wire from being lifted and tangled, thereby being capable of allowing the welding process to be more conveniently carried out, and achieving an improvement in the efficiency of the welding process.

BRIEF DESCRIPTION OF THE DRAWINGS

FIG. 1a is a perspective view illustrating a plurality of comb teeth having a vertical strip structure while being alternately arranged, FIG. 1b is a cross-sectional view corresponding to FIG. 1a, and FIG. 1c is a cross-sectional view illustrating a modification in which the comb teeth having the vertical strip structure are inclined while being alternately arranged;

FIG. 2a is a perspective view illustrating a plurality of comb teeth having a horizontal strip structure while being alternately arranged, FIG. 2b is a cross-sectional view corresponding to FIG. 2a, and FIG. 2c is a cross-sectional view illustrating a modification in which the comb teeth having the horizontal strip structure are inclined while being alternately arranged;

FIG. 3a is a perspective view illustrating a plurality of comb teeth having a horizontal strip structure, the comb teeth being mounted to the upper surface of an outer ring and the lower surface of an inner ring while being alternately arranged, respectively, FIG. 3b is a cross-sectional view corresponding to FIG. 3a, and FIG. 3c is a cross-sectional view illustrating a modification in which the comb teeth having the horizontal strip structure are inclined while being alternately arranged;

FIG. 4a is a perspective view illustrating a plurality of comb teeth having a horizontal strip structure, the comb teeth being mounted to the upper surface of an outer ring and the upper surface of an inner ring while being alternately arranged, respectively, FIG. 4b is a cross-sectional view corresponding to FIG. 4a, and FIG. 4c is a cross-sectional view illustrating a modification in which the comb teeth having the horizontal strip structure are inclined while being alternately arranged;

FIG. 5a is a perspective view illustrating a plurality of comb teeth having a vertical strip structure and forming a desired acute angle in the drawing direction of a welding wire with respect to respective outer and inner rings while being alternately arranged, and FIG. 5b is a cross-sectional view corresponding to FIG. 5a;

FIG. 6a is a perspective view illustrating a plurality of comb teeth having a vertical strip structure, forming a desired acute angle in the drawing direction of a welding wire with respect to respective outer and inner rings, and forming a desired acute angle with respect to the top surface of a tube-shaped wound body of the welding wire while being alternately arranged, and FIG. 6b is a cross-sectional view corresponding to FIG. 6a;

FIG. 7a is a perspective view illustrating a plurality of comb teeth having a thin brush structure while being alternately arranged, FIG. 7b is a cross-sectional view corresponding to FIG. 7a, and FIG. 7c is a cross-sectional view illustrating a modification in which the comb teeth having the thin brush structure are inclined while being alternately arranged;

FIG. 8a is a perspective view illustrating a plurality of comb teeth having a thin brush structure and forming a desired acute angle in the drawing direction of a welding wire with respect to respective outer and inner rings while being alternately arranged, FIG. 8b is a cross-sectional view corresponding to FIG. 8a, and FIG. 8c is a cross-sectional view illustrating a modification in which the comb teeth having the thin brush structure are inclined while being alternately arranged;

FIG. 9a is a perspective view illustrating a plurality of comb teeth having a vertical strip structure while being alternately arranged, and guides formed at respective lower surfaces of outer and inner rings, FIG. 9b is a cross-sectional view corresponding to FIG. 9a, and FIG. 9c is a cross-sectional view illustrating a modification in which the comb teeth having the vertical strip structure are inclined while being alternately arranged;

FIG. 10a is a perspective view illustrating a plurality of comb teeth having a horizontal strip structure while being alternately arranged, and guides provided with steps formed at respective lower surfaces of outer and inner rings, FIG. 10b is a cross-sectional view corresponding to FIG. 10a, and FIG. 10c is a cross-sectional view illustrating a modification in which the comb teeth having the horizontal strip structure are inclined while being alternately arranged;

FIG. 11a is a perspective view illustrating a plurality of comb teeth having a vertical strip structure, forming a desired acute angle in the drawing direction of a welding wire with respect to respective outer and inner rings, and forming a desired acute angle with respect to the top surface of a tube-shaped wound body of the welding wire while being alternately arranged, and guides provided with steps formed at respective lower surfaces of outer and inner rings, and FIG. 11b is a cross-sectional view corresponding to FIG. 11a;

FIG. 12a is a perspective view illustrating a plurality of comb teeth having a thin brush structure while being alternately arranged, and guides provided with steps formed at respective lower surfaces of outer and inner rings, and FIG. 12b is a cross-sectional view corresponding to FIG. 12a, and FIG. 12c is a cross-sectional view illustrating a modification in which the comb teeth having the thin brush structure are inclined while being alternately arranged;

FIG. 13a is a perspective view illustrating a plurality of comb teeth having a thin brush structure and forming a desired acute angle in the drawing direction of a welding wire with respect to respective outer and inner rings while being alternately arranged, and guides provided with steps formed at respective lower surfaces of outer and inner rings, and FIG. 13b is a cross-sectional view corresponding to FIG. 13a, and FIG. 13c is a cross-sectional view illustrating a modification in which the comb teeth having the thin brush structure are inclined while being alternately arranged;

FIG. 14a is a perspective view illustrating a ring member provided with covers surrounding outer and inner rings, and a plurality of comb teeth having a vertical strip structure formed between the outer and inner rings, and FIG. 14b is a cross-sectional view corresponding to FIG. 14a;

DETAILED DESCRIPTION OF THE INVENTION

Figure 1A:
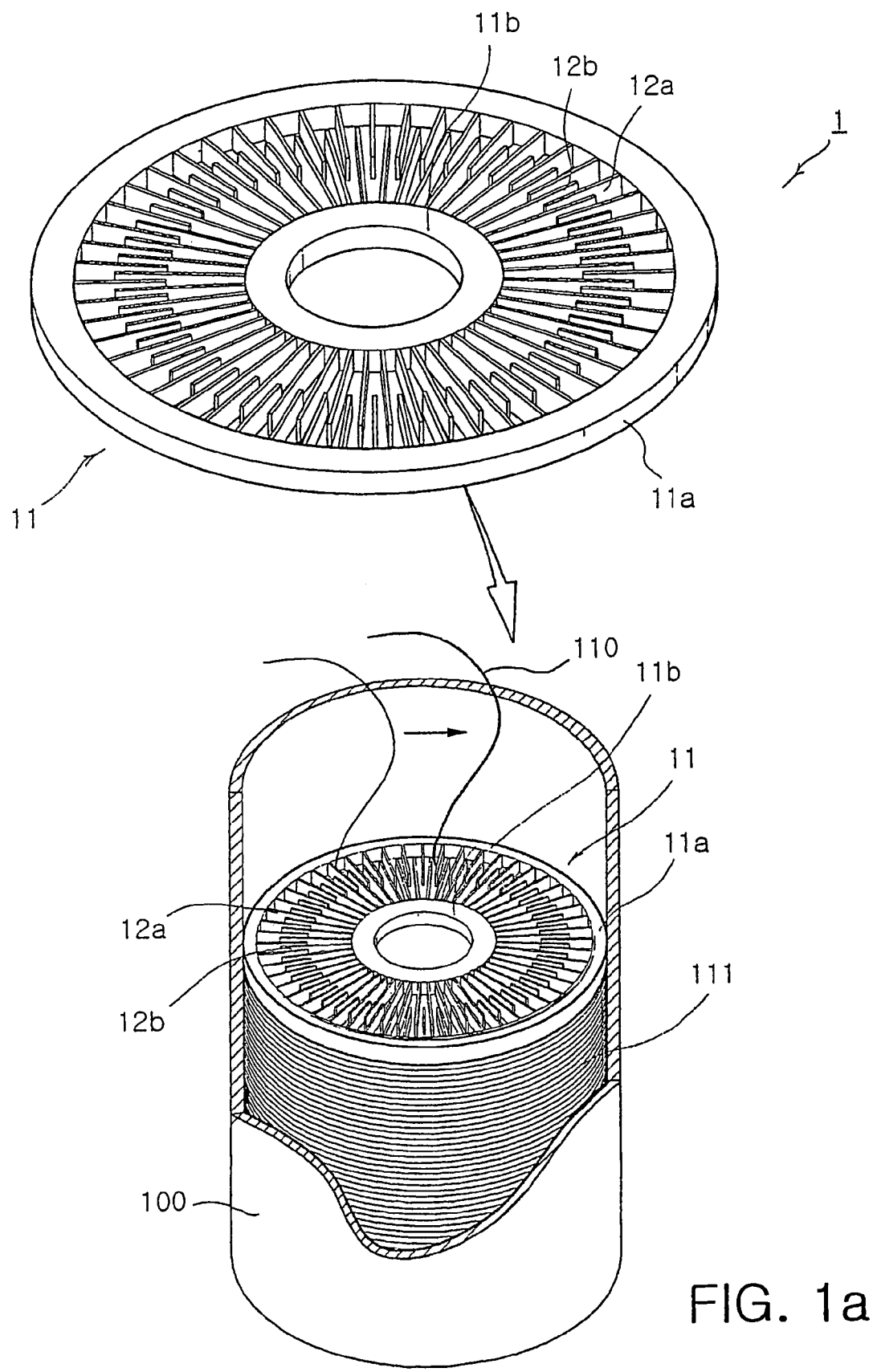
FIGS. 1a to 1c illustrate a welding wire tangling-prevention device according to a first embodiment of the present invention, respectively.

In accordance with one aspect, the present invention provides a welding wire tangling-prevention device for preventing tangling of a welding wire received in a large-capacity pail pack in the form of a vertically-extending tube-shaped wound body including eccentrically-stacked continuous spiral loops, when the welding wire is drawn out from the pail pack, comprising:

a ring member laid on a top surface of the tube-shaped wound body, the ring member including an outer ring having an outer diameter smaller than an inner diameter of the pail pack, and an inner ring having an outer diameter smaller than an inner diameter of the outer ring;

a plurality of first comb teeth extending from an inner circumferential surface of the outer ring toward the inner ring; and a plurality of second comb teeth extending from an outer circumferential surface of the inner ring toward the outer ring, whereby the welding wire is drawn out between the outer and inner rings.

In accordance with another aspect, the present invention provides a welding wire tangling-prevention device for preventing tangling of a welding wire received in a large-capacity pail pack in the form of a vertically-extending tube-shaped wound body including eccentrically-stacked continuous spiral loops, when the welding wire is drawn out from the pail pack, comprising:

a ring member laid on a top surface of the tube-shaped wound body, the ring member including an outer ring having an outer diameter smaller than an inner diameter of the pail pack, and an inner ring having an outer diameter smaller than an inner diameter of the outer ring;

a plurality of first comb teeth extending from an inner circumferential surface of the outer ring toward the inner ring;

a plurality of second comb teeth extending from an outer circumferential surface of the inner ring toward the outer ring; and first and second guides for minimizing a drawing resistance of the welding wire drawn out between the outer and inner rings, the first and second guides extending radially from respective lower surfaces of the outer and inner rings to form annular steps extending by a desired length between the outer and inner rings, respectively.

In accordance with another aspect, the present invention provides a welding wire tangling-prevention device for preventing tangling of a welding wire received in a large-capacity pail pack in the form of a vertically-extending tube-shaped wound body including eccentrically-stacked continuous spiral loops, when the welding wire is drawn out from the pail pack, comprising:

a ring member laid on a top surface of the tube-shaped wound body, the ring member including an outer ring having an outer diameter smaller than an inner diameter of the pail pack, an inner ring having an outer diameter smaller than an inner diameter of the outer ring, and first and second covers respectively surrounding the outer and inner rings;

a plurality of first comb teeth having a thin brush structure, the first comb teeth surrounding the outer ring while being surrounded by the first cover so that they are tightly interposed between the outer ring and the first cover, each of the first comb teeth extending, at both ends thereof, from an inner circumferential portion of the outer ring toward the inner ring though an annular opening formed at an inner circumferential portion of the first cover;

a plurality of second comb teeth having a thin brush structure, the second comb teeth surrounding the inner ring while being surrounded by the second cover so that they are tightly interposed between the inner ring and the second cover, each of the second comb teeth extending, at both ends thereof, from an outer circumferential portion of the inner ring toward the outer ring though an annular opening formed at an outer circumferential portion of the second cover; and guides for minimizing a drawing resistance of the welding wire drawn between the first and second comb teeth, the guides comprising lips respectively protruded by a desired length from the first and second covers of the outer and inner rings around the annular openings provided at the first and second covers along the first and second comb teeth.

Now, preferred embodiments of the present invention will be described in detail with reference to the annexed drawings.

Referring to FIG. 1a, a welding wire tangling-prevention device according to a first embodiment of the present invention is illustrated. The welding wire tangling-prevention device, which is denoted by the reference numeral 1, serves to prevent tangling of a welding wire 110 received in a large-capacity pail pack 100 in the form of a vertical tube including eccentrically-stacked continuous spiral loops, when the welding wire 110 is drawn out from the pail pack 100.

The welding wire tangling-prevention device 1 of the present invention includes a ring member 11 laid on the top of the tube-shaped wound body 111, as a means for controlling the welding wire 110 from tangling while being drawn out from the pail pack 100.

The ring member 11 includes an outer ring 11a having an outer diameter smaller than the inner diameter of the pail pack 100, and an inner ring 11b having an outer diameter smaller than the inner diameter of the outer ring 11a. The outer ring 11a has a plurality of comb teeth 12a extending from the inner circumferential surface of the outer ring 11a toward the inner ring 11b. Also, the inner ring 11b has a plurality of comb teeth 12b extending from the outer circumferential surface of the inner ring 11b toward the outer ring 11a.

The welding wire 110 can be freely drawn out from a gap defined between the outer ring 11a and the inner ring 11b.

Since the welding wire 110 is freely drawn out between the outer ring 11a and the inner ring 11b while pushing those ring members 11a and 11b in accordance with this arrangement, it is unnecessary to use any weight, as compared to the conventional case in which such a weight is laid on the annular member in order to increase the weight of the annular member.

The comb teeth 12a and 12b of the ring member 11 serve to allow the welding wire 110 having the form of continuous spiral loops to be easily drawn out between the outer and inner rings 11a and 11b by a very small force applied thereto as it pushes those of the comb teeth 12a and 12b coming into contact therewith in the drawing direction while gradually releasing its loop shape only at its uppermost loop.

At this time, the welding wire 110 gradually releases its loops one by one from a stacked state by the ring member 11 and comb teeth 12a and 12b. Accordingly, when an uppermost loop of the welding wire 110 is drawn out by the drawing force, there are no problems of causing subsequent welding wire loops to be drawn out, thereby to be tangled, as in the conventional inner or outer drawing device, or causing the welding wire to protrude outwardly between the inner surface of the pail pack and the outer circumference of the drawing device, thereby to be tangled.

The comb teeth 12a and 12b are elastically recovered to return to their original positions, thereby preventing the subsequent loops of the welding wire 110 from being lifted.

The comb teeth 12a and 12b are preferably made of a material having a desired flexibility and a desired elasticity so that they are easily flexible by a drawing force applied to the welding wire 110, and then recoverable to their original state when the drawing force is released.

In the case of the welding wire 110, which is eccentrically stacked in the form of continuous spiral loops, during a transportation or handling of the welding wire 110, one or more upper ones of the loops may be interposed between lower ones of the loops. As a result, two or more loops of the welding wire 110 may be drawn out, so that they are lifted or tangled.

In the welding wire tangling-prevention device according to the present invention, however, such a phenomenon does not occur because the ring member 11 includes the outer and inner rings 11a and 11b respectively having a plurality of comb teeth 12a extending from the inner circumferential surface of the outer ring 11a toward the inner ring 11b, and a plurality of comb teeth 12b extending from the outer circumferential surface of the inner ring 11b toward the outer ring 11a. That is, although one or more upper ones of the stacked loops may be undesirably interposed between lower ones of the loops, the comb teeth 12a and 12b prevent those loops from being simultaneously drawn out. Although two or more loops of the welding wire 110 may tend to be simultaneously drawn out, the comb teeth 12a and 12b apply a drawing resistance to those loops, thereby preventing the welding wire 110 from being lifted or tangled.

During the drawing of the welding wire 110, the ring member 11 moves slightly in left and right directions as a part of its comb teeth 12a and 12b comes into contact with the welding wire 110. In accordance with such movements, the ring member 11 is freely lowered, simultaneously with the consumption of the welding wire 110.

Figure 1B:
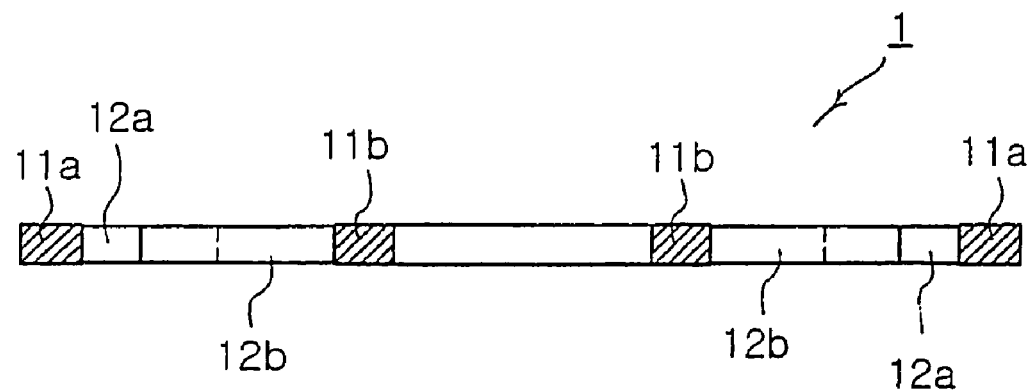

As shown in FIG. 1b, it is preferable that the comb teeth 12a of the outer ring 11a have a length equal to or smaller than the length of the comb teeth 12b of the inner ring 11b.

Where the comb teeth 12a of the outer ring 11a are longer than the comb teeth 12b of the inner ring 11b, the uppermost loop of the welding wire 110 may be lifted due to elasticity or draw out subsequent loops as it is drawn out since the comb teeth 12a of the outer ring 11a supplies drawing resistance when one loop of the welding wire 110 is released and recovers from eccentrically-stacked continuous spiral loops in the pail pack 100. Accordingly, it is more preferable that the comb teeth 12a of the outer ring 11a are shorter than the comb teeth 12b of the inner ring 11b.

Preferably, the comb teeth 12a and 12b of the outer and inner rings 11a and 11b have a length equal to or smaller than the difference between the inner diameter of the outer ring 11a and the outer diameter of the inner ring 11b.

Where the comb teeth 12a and 12b of the outer and inner rings 11a and 11b are longer than the difference between the inner diameter of the outer ring 11a and the outer diameter of the inner ring 11b, they increase the drawing resistance of the welding wire 110. In severe cases, the outer and inner rings 11a and 12a may be upwardly moved by the welding wire 110 during the drawing procedure. In order to achieve a reduction in drawing resistance, it is preferable that the comb teeth 12a or 12b each of the outer and inner rings 11a and 11b have a length equal to or smaller than the difference between the inner diameter of the outer ring 11a and the outer diameter of the inner ring 11b.

Also, it is preferable that the comb teeth 12a and 12b of the outer and inner rings 11a and 11b are alternately arranged. In accordance with such an arrangement, the comb teeth 12a and 12b can cooperate to control the welding wire 110 during the drawing procedure.

Figure 1C:
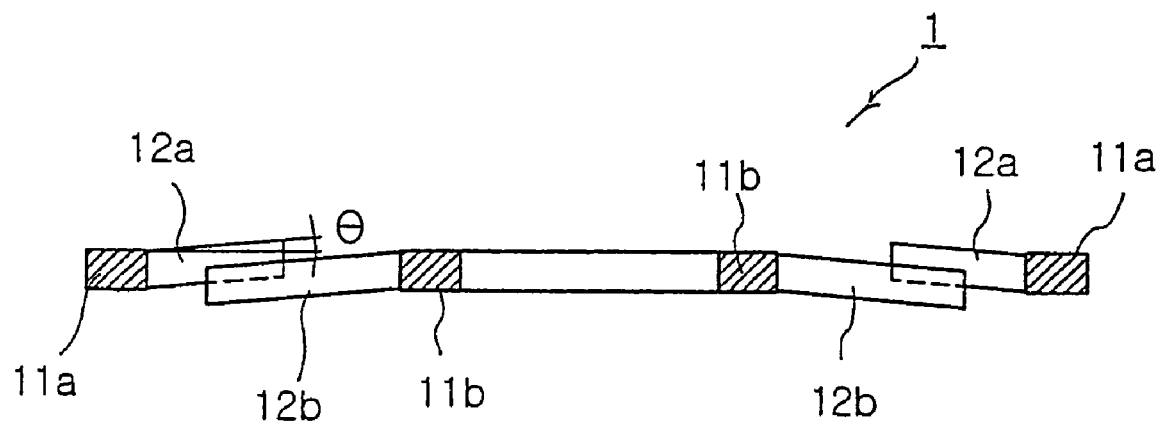

As shown in FIG. 1c, the comb teeth 12a may be upwardly inclined by a desired angle θ while extending from the outer ring 11a toward the inner ring 11b, whereas the comb teeth 12b may be downwardly inclined by the angle θ while extending from the inner ring 11b toward the outer ring 11a. Alternatively, the comb teeth 12a may be downwardly inclined by the angle θ while extending from the outer ring 11a toward the inner ring 11b, whereas the comb teeth 12b may be upwardly inclined by the angle θ while extending from the inner ring 11b toward the outer ring 11a.

By virtue of such an inclined structure, the comb teeth 12b can conform to the top of the wound wire body 111 typically having an inclined surface. Accordingly, the welding wire 110 can be more stably drawn out.

Also, this inclined structure of the comb teeth 12a and 12b is effective in that the welding wire 110 can come into contact with the comb teeth 12a and 12b at a reduced angle while being drawn out, thereby reducing the drawing resistance thereof.

Figure 2A:
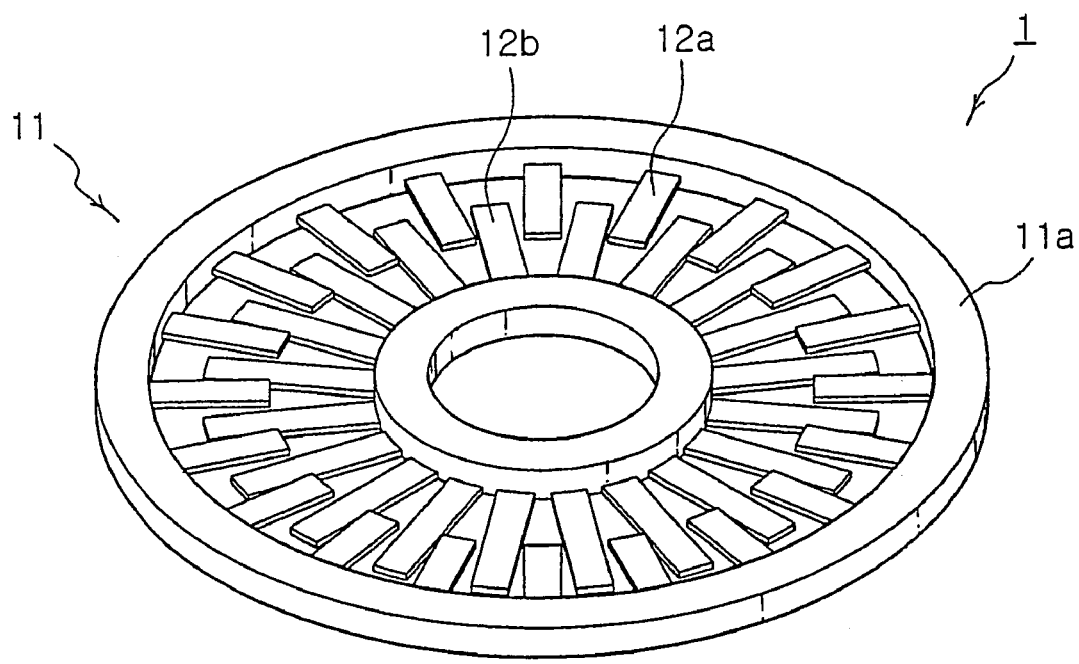
FIGS. 2a to 2c illustrate a modification of the first embodiment of the present invention, respectively.
Figure 2B:
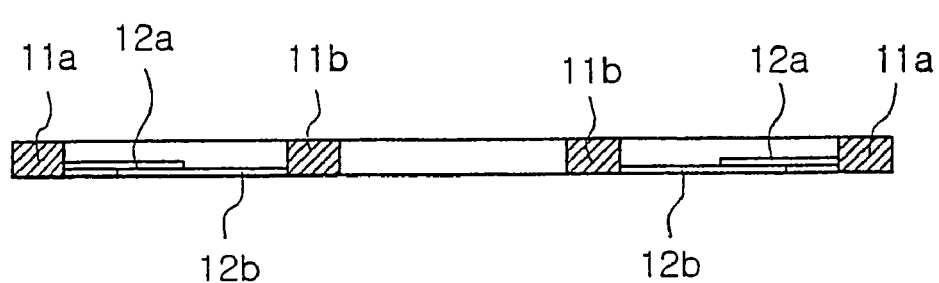

Also, the comb teeth 12a and 12b may have a horizontal structure, as shown in FIGS. 2a and 2b. Similarly to the case of FIG. 1, the comb teeth 12a and 12b in this case allow the welding wire 110 having the form of continuous spiral loops to be easily drawn out between the outer and inner rings 11a and 11b by a very small force applied thereto as it pushes those of the comb teeth 12a and 12b coming into contact therewith in the drawing direction while gradually releasing its loop shape only at its uppermost loop.

Figure 2C:
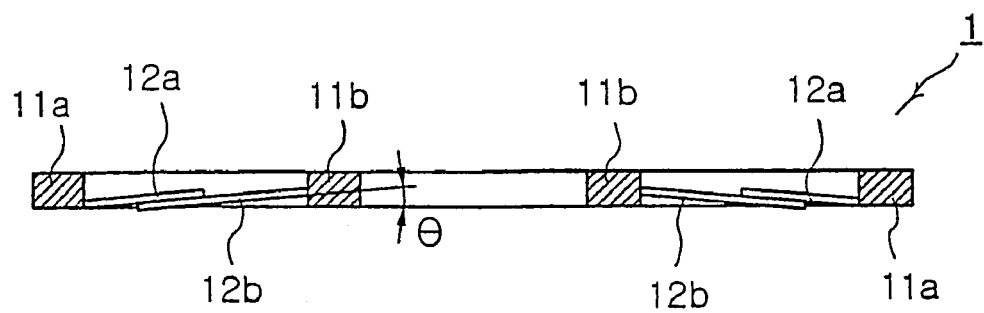

In this case, as shown in FIG. 2c, the comb teeth 12a and 12b may be alternately arranged while being inclined by a desired angle θ between the outer ring 11a and toward the inner ring 11b.

By virtue of such an inclined structure, the comb teeth 12b can conform to the top of the wound wire body 111 having an inclined surface. Accordingly, the welding wire 110 can be more stably drawn out. Also, this inclined structure of the comb teeth 12a and 12b is effective in that the welding wire 110 can come into contact with the comb teeth 12a and 12b at a reduced angle while being drawn out, thereby reducing the drawing resistance thereof.

Figure 3A:
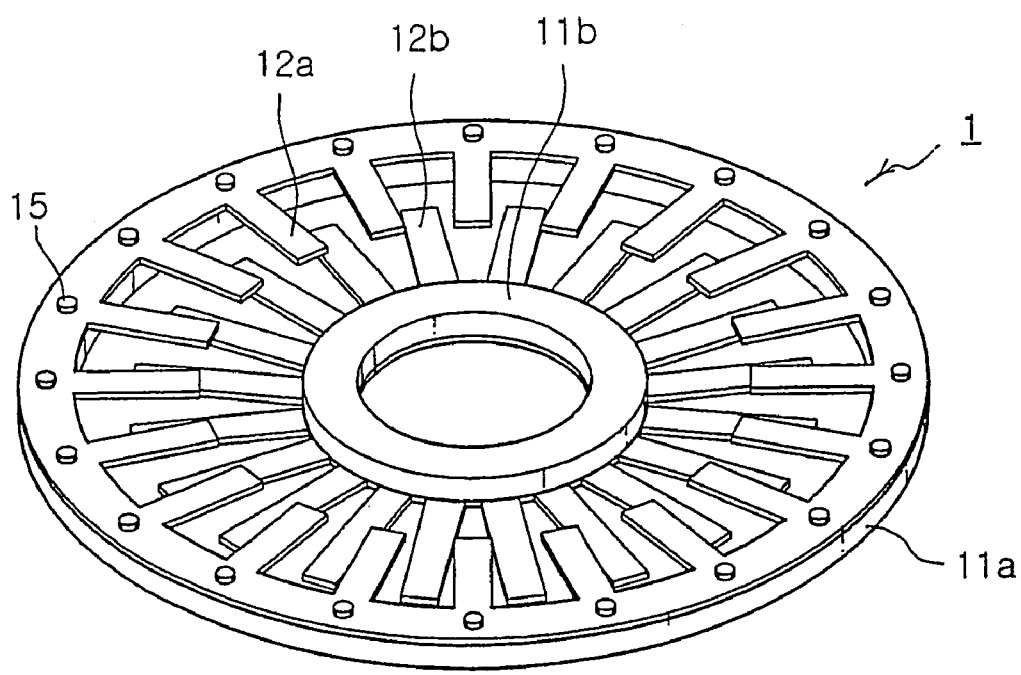
FIGS. 3a to 3c illustrate another modification of the first embodiment of the present invention, respectively.
Figure 3B:
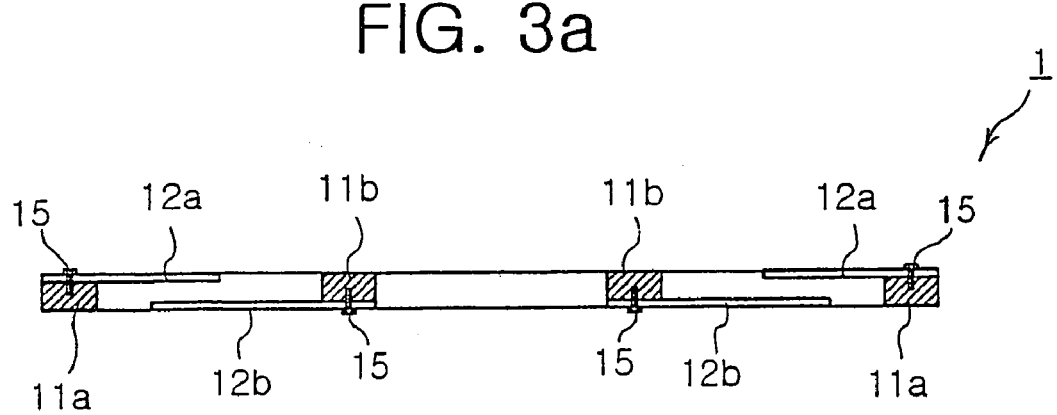

In accordance with the first embodiment of the present invention, the comb teeth 12a and 12b may also have a flat or horizontal strip structure, as shown in FIGS. 3a and 3b. In this case, the comb teeth 12a and 12b are manufactured separately from the outer and inner rings 11a and 11b, respectively. The comb teeth 12a and 12b are fixedly mounted to the upper surface of the outer ring 12a and the lower surface of the inner ring 12b by means of set screws 15, respectively. The mounting of the comb teeth 12a and 12b to respective outer and inner rings 11a and 11b may be achieved using fitting grooves and protrusions of course, the comb teeth 12a and 12b may be integrally formed with respective outer and inner rings 11a and 11b using a molding process. In either case, the comb teeth 12a and 12b are alternately arranged. In accordance with this modified structure, the comb teeth 12a and 12b are spaced apart from each other by a desired distance, so that the welding wire 110 can be easily drawn out between the outer and inner rings 11a and 11b even by a smaller force applied thereto as it sequentially passes the comb teeth 12a and 12b.

Thus, the welding wire 110 having the form of continuous spiral loops is easily drawn out while gradually releasing its loop shape only at its uppermost loop as it passes the comb teeth 12a and 12b.

Figure 3C:
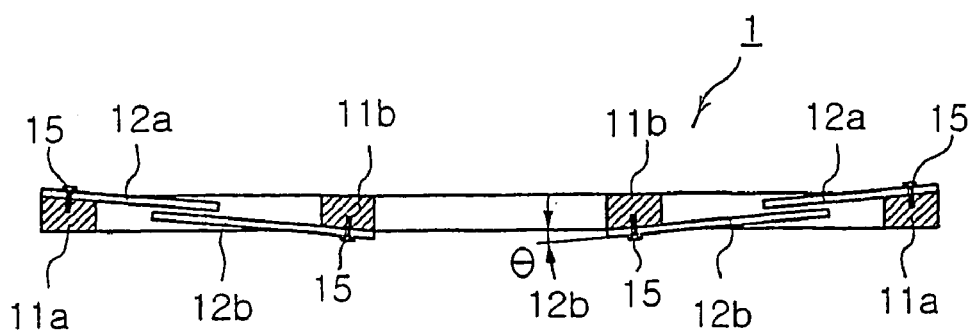

As shown in FIG. 3c, the comb teeth 12a and 12b may be alternately arranged while being inclined by a desired angle θ between the outer ring 11a and the inner ring 11b. In the illustrated case, the outer and inner rings 11a and 11b are formed to have surfaces inclined by the angle θ respectively. The comb teeth 12a and 12b are mounted to respective inclined surfaces of the outer and inner rings 11a and 11b so that they are inclined by the angle θ.

In this case, the inclined comb teeth 12b can conform to the top of the wound wire body 111 having an inclined surface. Accordingly, the welding wire 110 can be more stably drawn out. Also, this inclined structure of the comb teeth 12a and 12b is effective in that the welding wire 110 can come into contact with the comb teeth 12a and 12b at a reduced angle while being drawn out, thereby reducing the drawing resistance thereof.

Figure 4A:
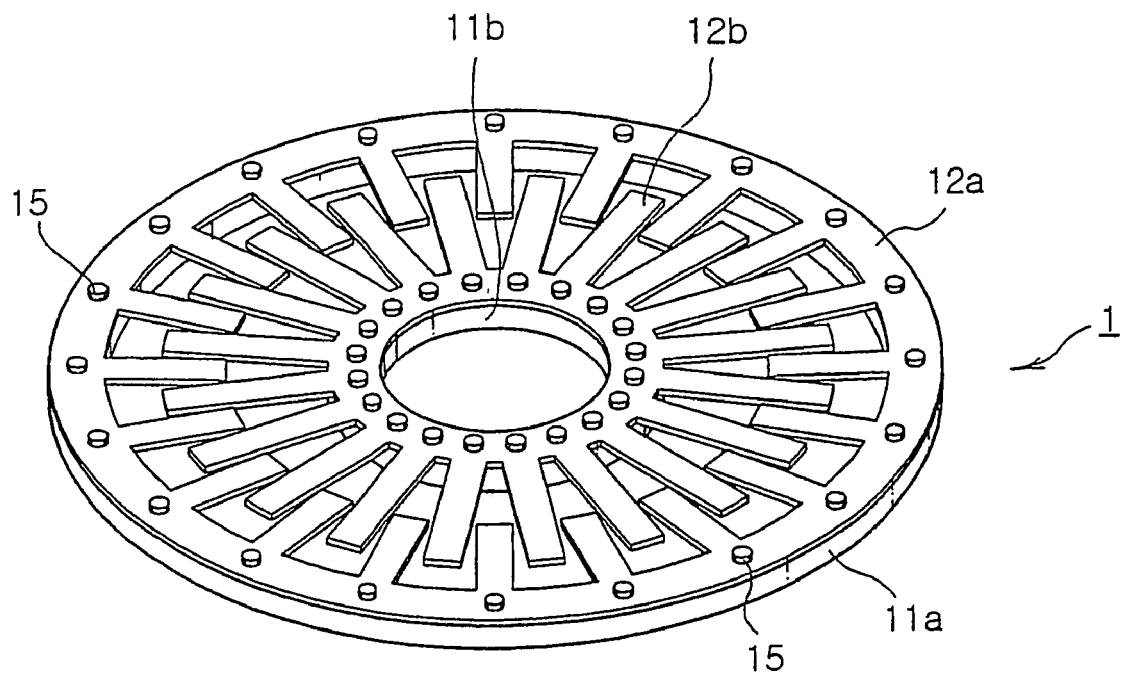
FIGS. 4a to 4c illustrate another modification of the first embodiment of the present invention, respectively.
Figure 4B:
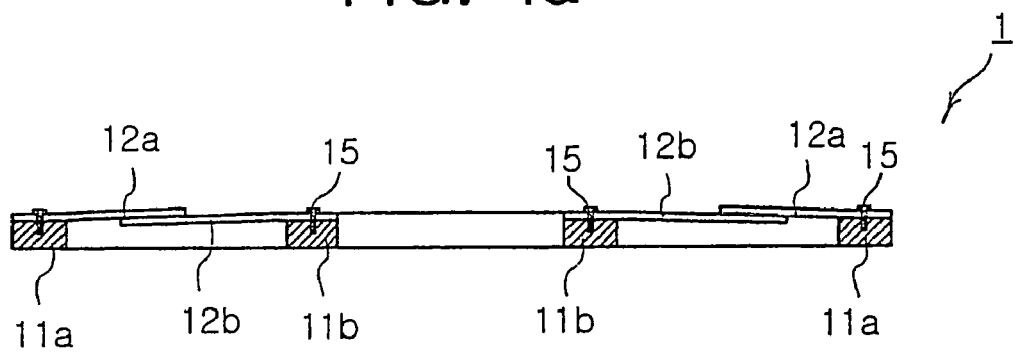

In accordance with the first embodiment of the present invention, the comb teeth 12a and 12b may be fixedly mounted to the upper surface of the outer ring 12a and the lower surface of the inner ring 12b via set screws 15 or fitting grooves and protrusions, respectively, as shown in FIGS. 4a and 4b. Of course, the comb teeth 12a and 12b may be integrally formed with respective outer and inner rings 11a and 11b using a molding process. In either case, the comb teeth 12a and 12b are alternately arranged while being in a horizontal state.

Figure 4C:
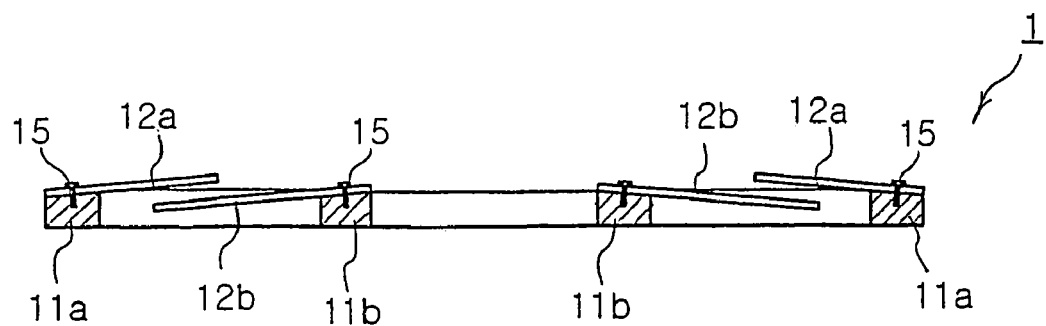

The modified structure obtains the same function and effect as those of FIGS. 3a and 3b. As shown in FIG. 4c, the comb teeth 12a and 12b may be alternately arranged while being inclined by a desired angle θ between the outer ring 11a and the inner ring 11b. In this case, the same effect as that of FIG. 3c is obtained.

Figure 5A:
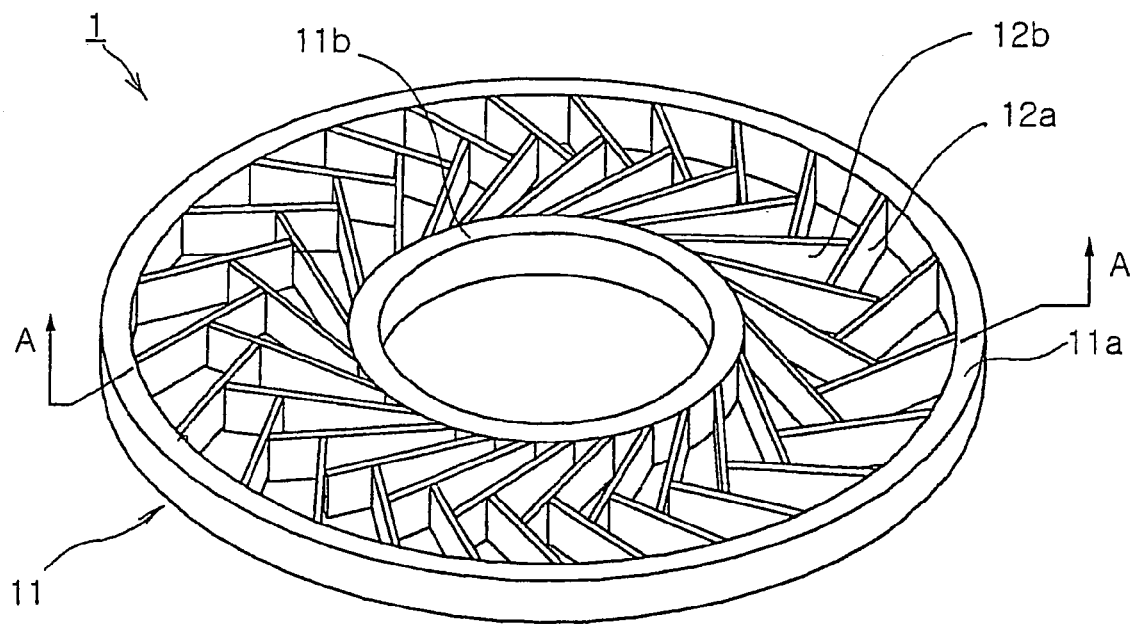
FIGS. 5a and 5b illustrate another modification of the first embodiment of the present invention, respectively.
Figure 5B:
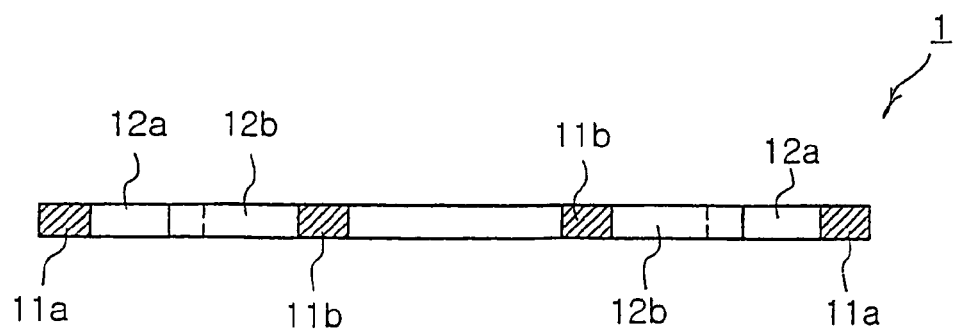

The comb teeth 12a and 12b may form a desired acute angle in the drawing direction of the welding wire 110 with respect to respective outer and inner rings 11a and 11b, as shown in FIG. 5a. In accordance with such a structure, the comb teeth 12a and 12b are easily flexible in the drawing direction when the welding wire 110 is drawn out, thereby reducing the drawing and supply resistance of the welding wire 110.

The welding wire 110 may be wound in the left or right direction in the pail pack 100. The present invention can be suitably used, irrespective of the winding direction of the welding wire 110. That is, the ring member 11 can be used in a normal state or in an inverted state in accordance with the winding direction of the welding wire 110. Accordingly, it is possible to reduce the drawing and supply resistance of the welding wire 110, irrespective of the winding direction of the welding wire 110.

The comb teeth 12a and 12b are easily flexible and recoverable because they have a strip shape extending in horizontal and vertical directions. Accordingly, it is possible to effectively control subsequent loops of the welding wire 110.

Figure 6A:
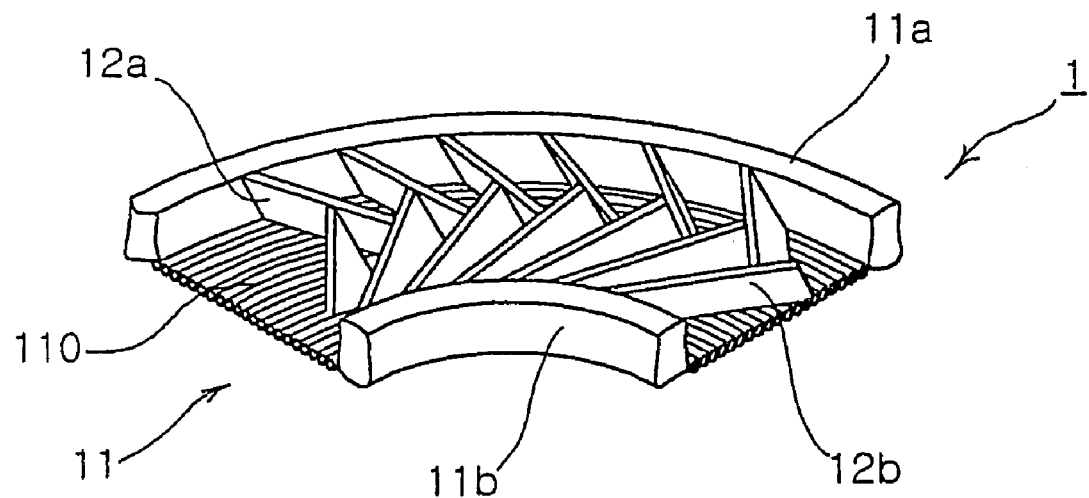
FIGS. 6a and 6b illustrate another modification of the first embodiment of the present invention, respectively.
Figure 6B:
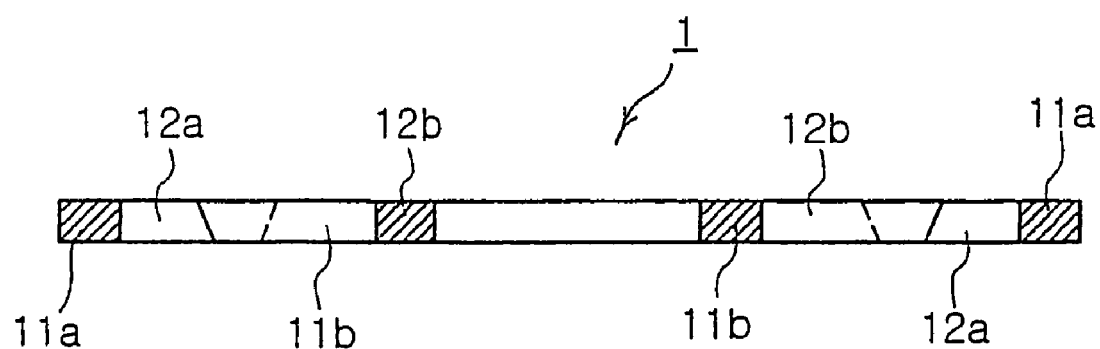

In accordance with the first embodiment of the present invention, as shown in FIGS. 6a and 6b, the comb teeth 12a and 12b may have a vertical structure while forming a desired acute angle in the drawing direction of the welding wire 110 with respect to respective outer and inner rings 11a and 11b, and forming a desired acute angle with respect to the top surface of the tube-shaped wound body 111. In accordance with such a structure, advantageous effects are provided.

That is, this structure allows the comb teeth 12a and 12b to be easily flexible in the drawing direction of the welding wire 110 during the wire drawing procedure, thereby reducing the drawing and supply resistance of the welding wire 110. Also, it is possible to prevent the loops of the welding wire 110 from being lifted because the outer and inner rings 11a and 10b, and the strip-shaped comb teeth 12a and 12b respectively coupled to the outer and inner rings 11a and 11b apply their weights to the top surface of the tube-shaped wound body 111. A separate pressing means (not shown) may be provided in order to prevent the loops of the tube-shaped wound body 111 from being tangled during the transportation or handling of the wound body 111.

Figure 7A:
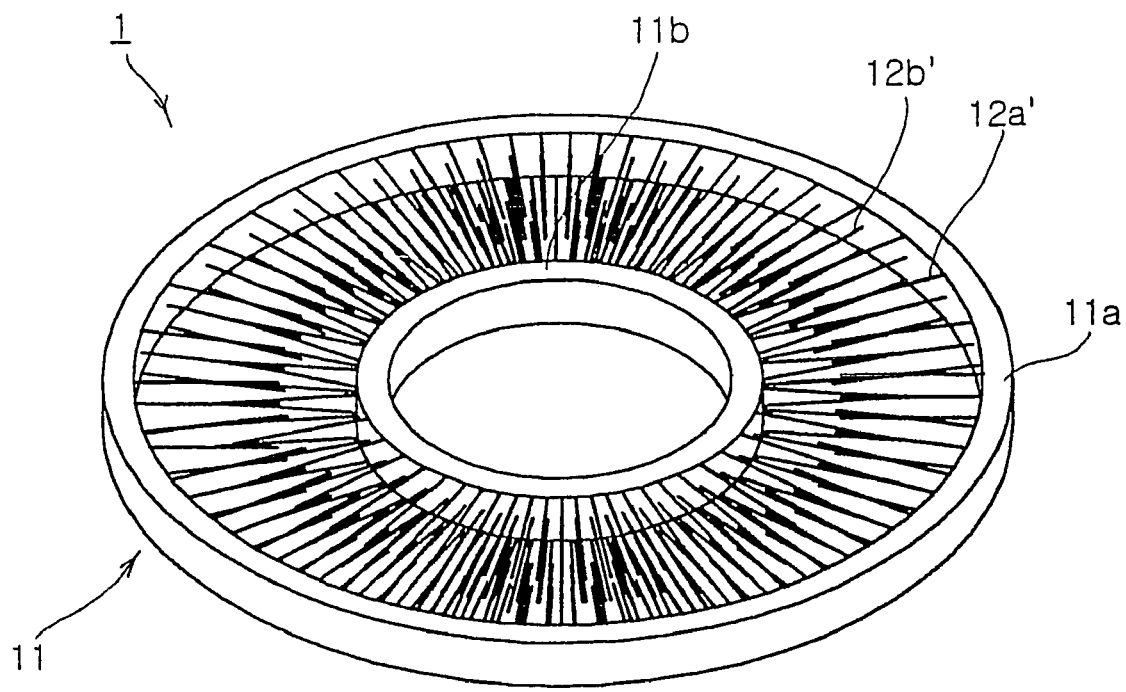
FIGS. 7a to 7c illustrate another modification of the first embodiment of the present invention, respectively.
Figure 7B:
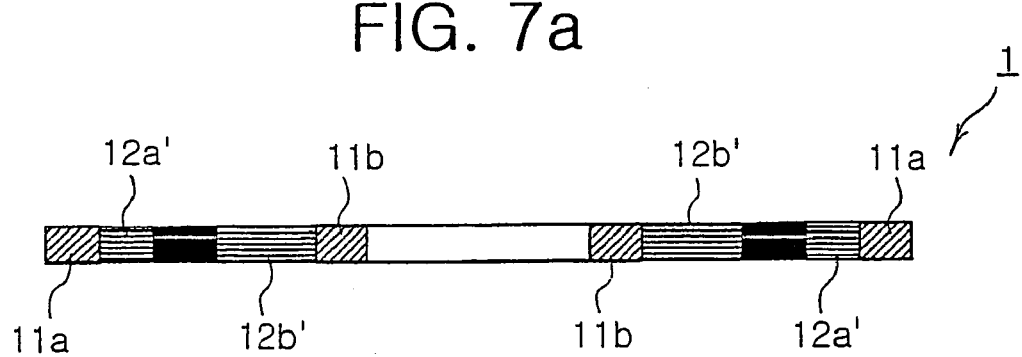

In accordance with the first embodiment of the present invention, another comb structure may be implemented in which comb teeth 12a' and 12b' respectively corresponding to the comb teeth 12a and 12b have a thin brush structure, as shown in FIGS. 7a and 7b.

By virtue of such a thin brush structure, the comb teeth 12a' and 12b' are easily flexible and recoverable. Since the flexibility of the comb teeth 12a' and 12b' is very high, the drawing and supply resistance of the welding wire 110 can be reduced to a minimum value. In particular, the comb teeth 12a' and 12b' have the form of feelers, so that they can effectively control subsequent loops of the welding wire 110.

Figure 7C:
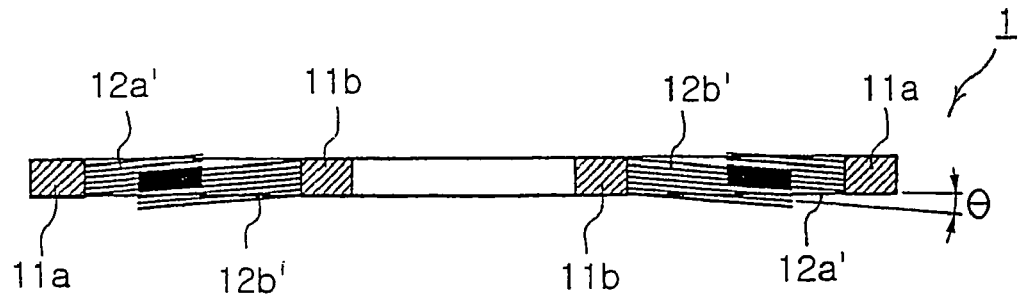

Also, the comb teeth 12a' and 12b' may be alternately arranged while being inclined by a desired angle θ between the outer ring 11a and the inner ring 11b, as shown in FIG. 7c. That is, the comb teeth 12a' may be upwardly inclined by the angle θ while extending from the outer ring 11a toward the inner ring 11b, whereas the comb teeth 12b' may be downwardly inclined by the angle θ while extending from the inner ring 11b toward the outer ring 11a. Alternatively, the comb teeth 12a' may be downwardly inclined by the angle θ while extending from the outer ring 11a toward the inner ring 11b, whereas the comb teeth 12b' may be upwardly inclined by the angle θ while extending from the inner ring 11b toward the outer ring 11a.

By virtue of such an inclined structure, the comb teeth 12b' can conform to the top of the wound wire body 111 having an inclined surface. Accordingly, the welding wire 110 can be more stably drawn out. Also, this inclined structure of the comb teeth 12a' and 12b' is effective in that the welding wire 110 can come into contact with the comb teeth 12a' and 12b' at a reduced angle while being drawn out, thereby reducing the drawing resistance thereof.

Figure 8A:
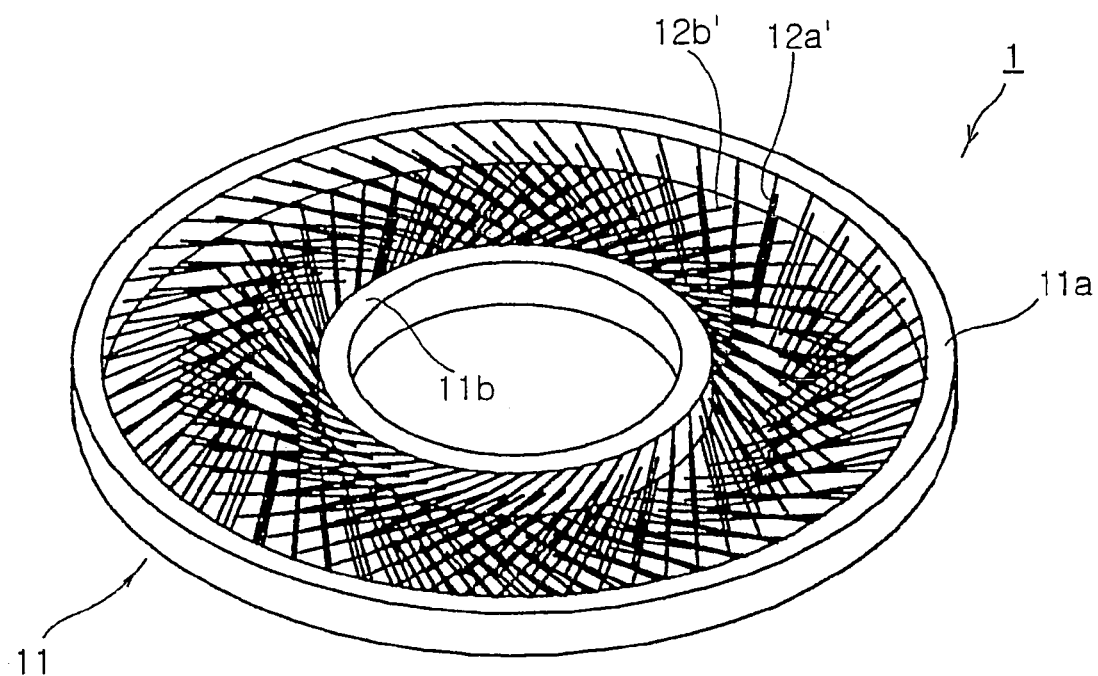
FIGS. 8a to 8c illustrate another modification of the first embodiment of the present invention, respectively.
Figure 8B:
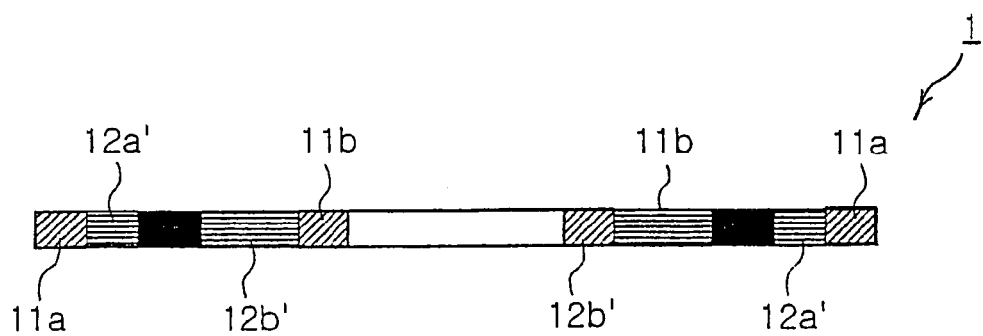
Figure 8C:
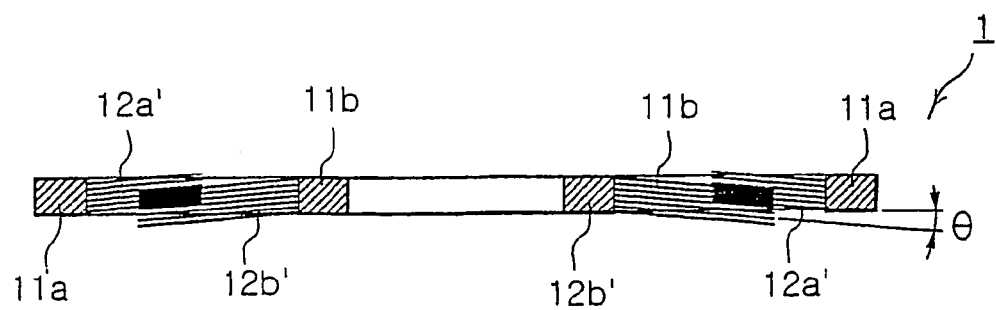

The comb teeth 12a' and 12b' may form a desired acute angle in the drawing direction of the welding wire 110 with respect to respective outer and inner rings 11a and 11b, as shown in FIGS. 8a to 8c. In accordance with such a structure, the comb teeth 12a' and 12b' are more easily flexible in the drawing direction when the welding wire 110 is drawn out, thereby reducing the drawing and supply resistance of the welding wire 110 to a lower value.

In this case, the comb teeth 12a' and 12b' may be alternately arranged while being inclined by a desired angle θ between the outer ring 11a and the inner ring 11b, as shown in FIG. 8c. That is, the comb teeth 12a' may be upwardly inclined by the angle θ while extending from the outer ring 11a toward the inner ring 10b, whereas the comb teeth 12b' may be downwardly inclined by the angle θ while extending from the inner ring 11b toward the outer ring 11a. Alternatively, the comb teeth 12a' may be downwardly inclined by the angle θ while extending from the outer ring 11a toward the inner ring 11b, whereas the comb teeth 12b' may be upwardly inclined by the angle θ while extending from the inner ring 11b toward the outer ring 11a.

In this case, the same effect as that of FIG. 7c is obtained.

The welding wire tangling-prevention device 1 according to the first embodiment of the present invention has been described with reference to FIGS. 3a to 4c as having a configuration in which the comb teeth 12a and 12b (or 12a' and 12b') are manufactured separately from the outer and inner rings 11a and 11b, and fixedly mounted to the upper surface of the outer ring 12a and the lower surface of the inner ring 12b by means of the set screws 15, respectively. However, superior effects are provided where the comb teeth 12a and 12b (or 12a' and 12b') are integrally formed with respective outer and inner rings 11a and 11b in accordance with an injection molding process.

Such an integral structure is advantageous in that it can be easily manufactured by mass production. It is preferable to manufacture this structure using a material such as a synthetic resin because the comb teeth 12a and 12b (or 12a' and 12b') should be easily flexible and elastically recoverable while being resistant to breakage or disassembly during the use thereof.

In this case, the welding wire tangling-prevention device 1 can exhibit reduced moisture absorption and reduced deterioration even after prolonged use. Also, there is no formation of scratches on the surface of the welding wire 110 or attachment of foreign matters to that surface. Accordingly, the supply of the welding wire 110 is not hindered.

Preferably, the ring member 11 is composed of two or more identical elements. In this case, superior effects are provided. In the case of the ring member 11 having an integral structure, there is a problem in that a mold having a very large size should be used. However, where the ring member 11 is composed of two or more identical elements, it is possible to easily dispose of the used ring member 11 after disassembling it. It is also possible to effectively use the space for storing the ring member 11 for re-use and re-utilization thereof.

Figure 9A:
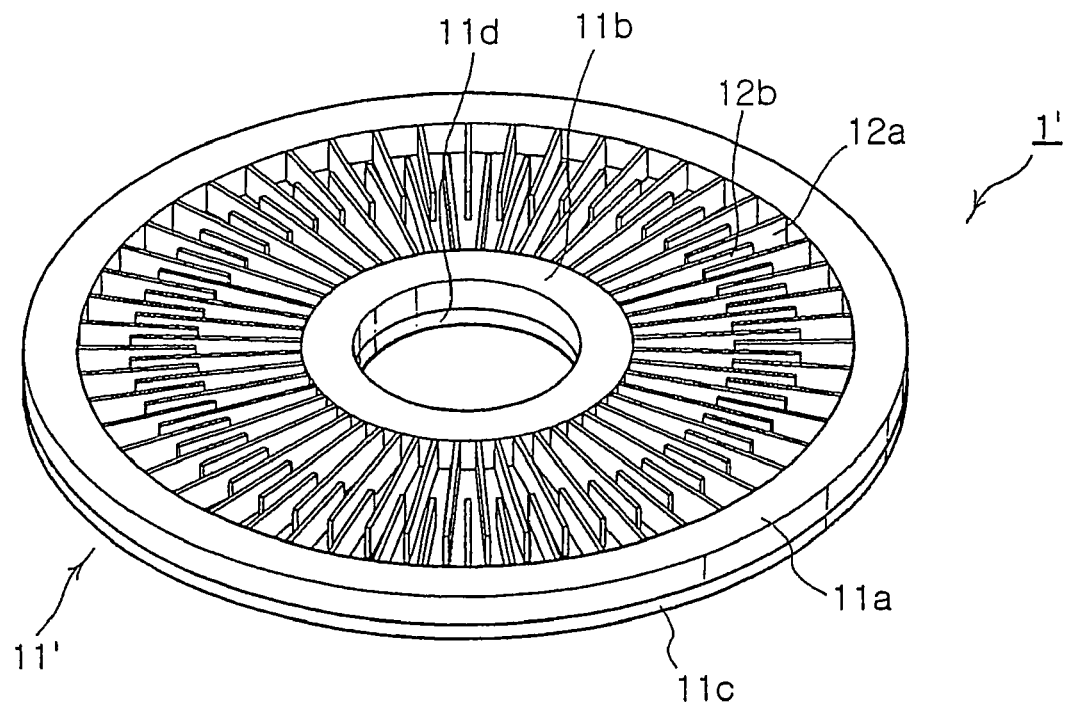
FIGS. 9a to 9c illustrate a welding wire tangling-prevention device according to a second embodiment of the present invention, respectively.
Figure 9B:
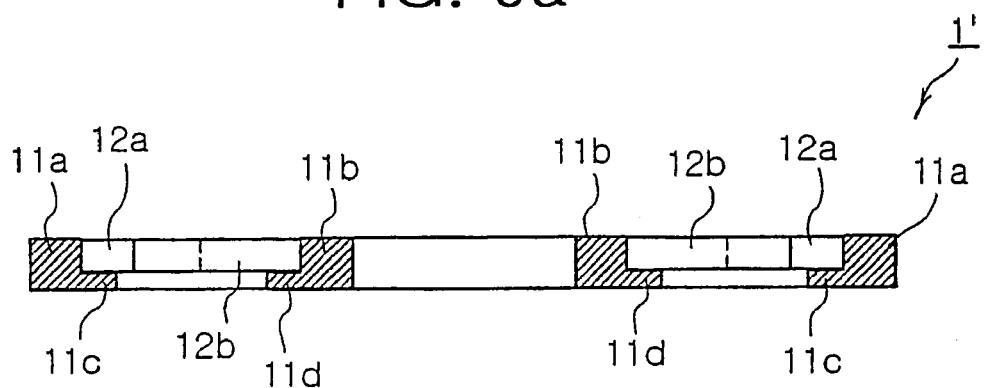

Referring to FIGS. 9a and 9b, a welding wire tangling-prevention device according to a second embodiment of the present invention is illustrated. The welding wire tangling-prevention device, which is denoted by the reference numeral 1', additionally includes guides 11c and 11d for minimizing the drawing resistance of the welding wire 110, as compared to the first embodiment of the present invention.

In accordance with the second embodiment of the present invention, the guides 11c and 11d extend radially from respective lower surfaces of the outer and inner rings 11a and 11b to in order to form annular steps extending by a desired length between the outer and inner rings 11a and 11b, respectively. The guides 11c and 11d may be integrally formed with respective outer and inner rings 11a and 11b using an injection molding process. Alternatively, the guides 11c and 11d may comprise separate annular members, respectively. In the latter case, the guides 11c and 11d are mounted to the outer and inner rings 12a and 12b by means of set screws (not shown), respectively. The mounting of the guides 11c and 11d to respective outer and inner rings 11a and 11b may be achieved using fitting grooves and protrusions (not shown).

The guide 11c formed at the lower surface of the outer ring 11a has an inner diameter smaller than the inner diameter of the outer ring 11a, whereas the guide 11d formed at the lower surface of the inner ring 11b has an outer diameter larger than the outer diameter of the inner ring 11b. Accordingly, the guides 11c and 11d prevent the loops of the welding wire 110 from being outwardly protruded near the circumferential surfaces of the outer and inner rings 11a and 11b as the welding wire 110 comes into contact with those outer and inner rings 11a and 11b in an excessively pressed state. The guides 11c and 11d cause the welding wire 110 to be drawn while approaching the free ends of the comb teeth 12a and 12b coming into contact therewith, thereby minimizing the drawing resistance of the welding wire 110 to those comb teeth 12a and 12b.

Figure 9C:
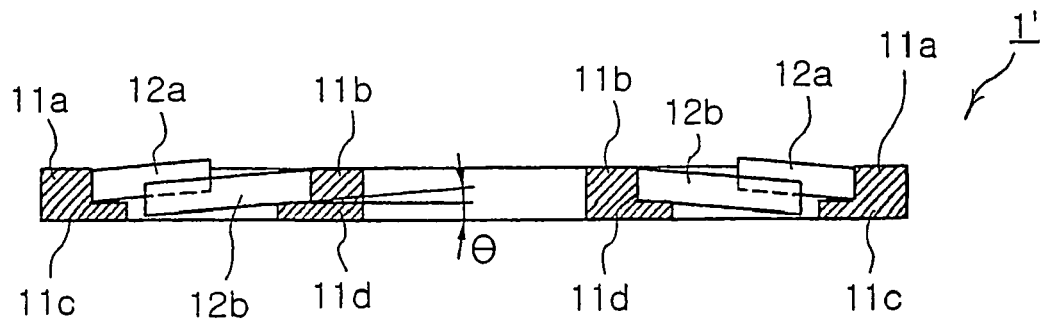

The comb teeth 12a of the outer ring 11a have a length smaller than the length of the comb teeth 12b of the inner ring 11b. Such a configuration may also be applied to the case in which a plurality of inclined comb teeth 12a and 12b having a vertical structure are alternately arranged, as shown in FIG. 9c.

Figure 10A:
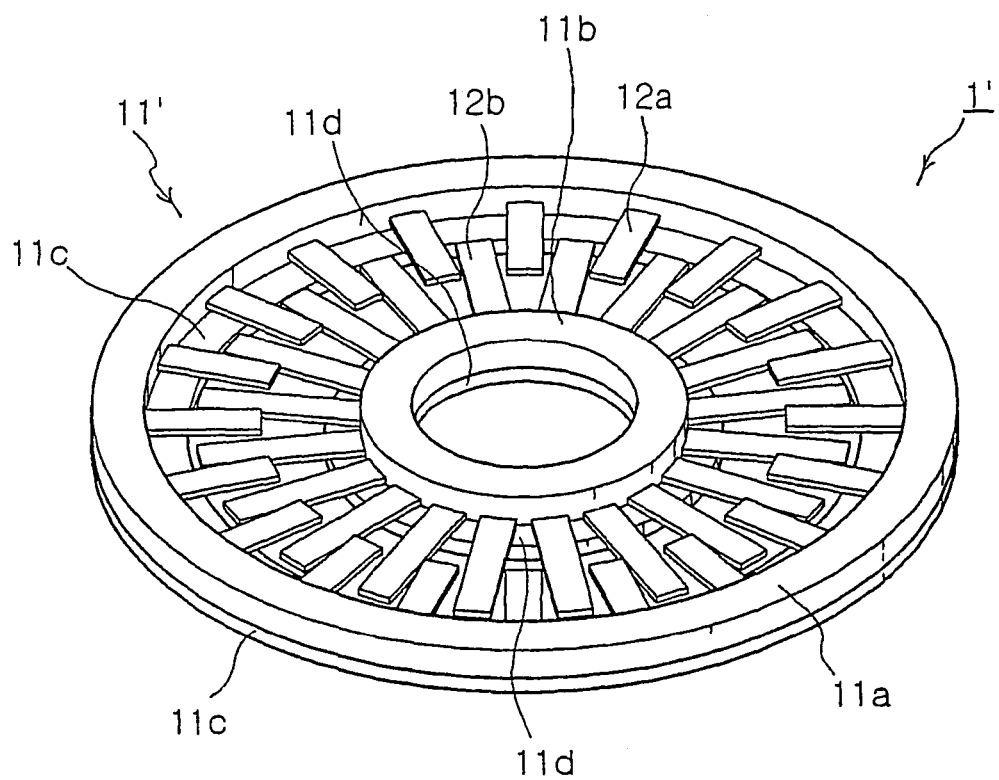
FIGS. 10a to 10c illustrate a modification of the second embodiment of the present invention, respectively.
Figure 10B:
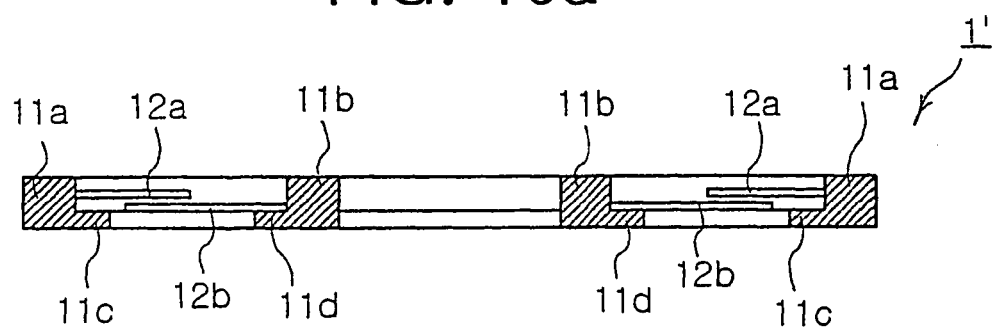

The configuration according to the second embodiment of the present invention may also be applied to the case in which a plurality of comb teeth 12a and 12b having a horizontal strip structure are alternately arranged, as shown in FIGS. 10a and 10b.

Figure 10C:
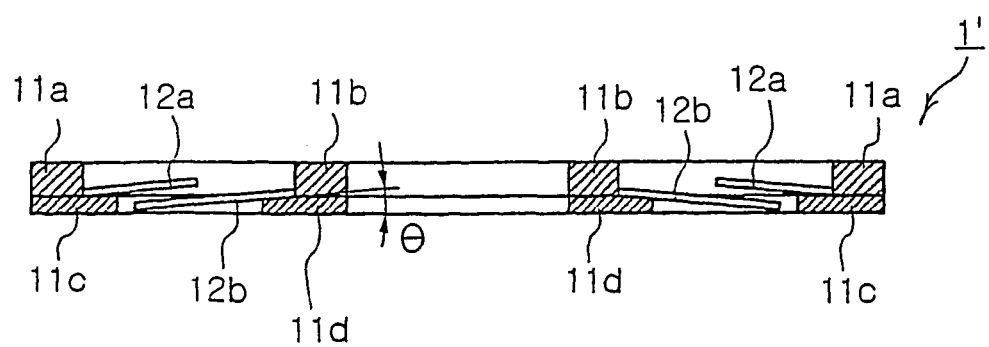

In this case, guides 11c and 11d are formed in the form of steps at respective lower surfaces of the outer and inner rings 11*a* and 11*b*. Also, the above described configuration may be applied to the case in which a plurality of inclined comb teeth 12*a* and 12*b* having a horizontal strip structure are alternately arranged, as shown in FIG. 10*c*.

Figure 11A:
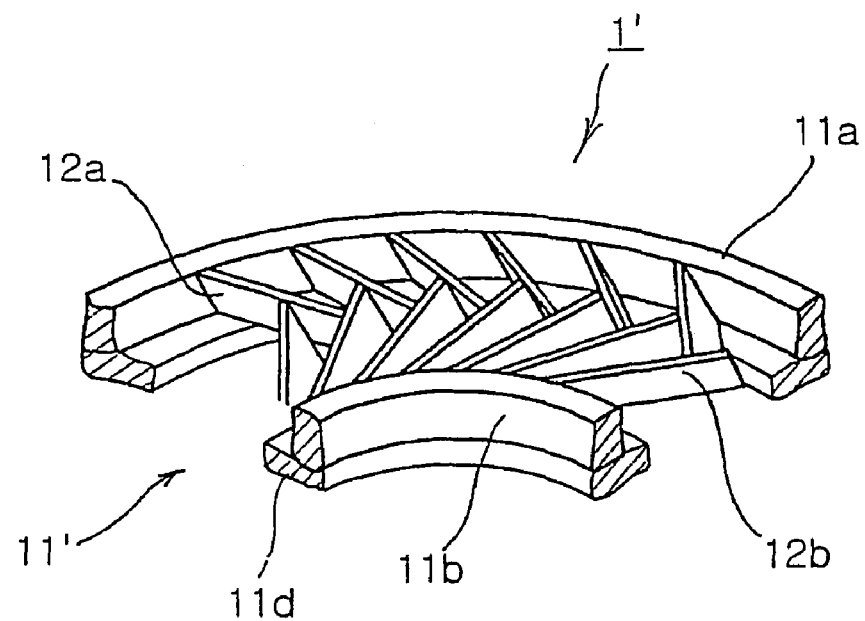
FIGS. 11a and 11b illustrate another modification of the second embodiment of the present invention, respectively.
Figure 11B:
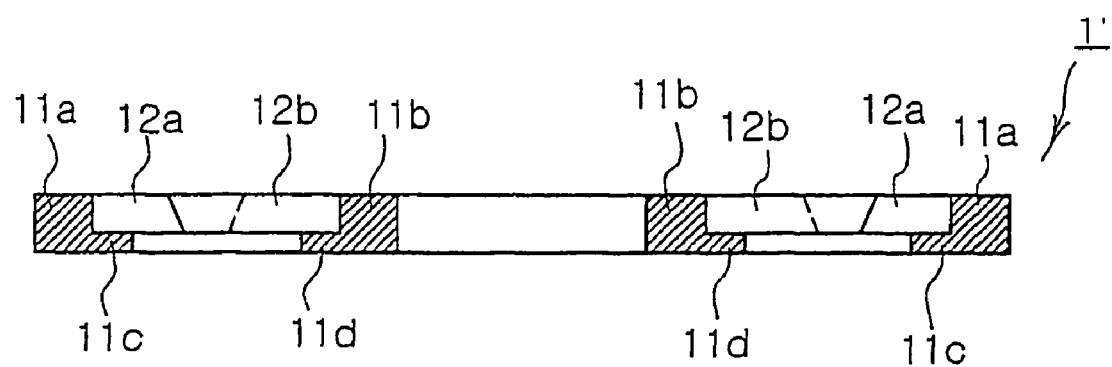

The configuration according to the second embodiment of the present invention may also be applied to the case in which a plurality of comb teeth 12*a* and 12*b* having a vertical structure are alternately arranged while forming a desired acute angle in the drawing direction of the welding wire 110 with respect to respective outer and inner rings 11*a* and 11*b*, and forming a desired acute angle with respect to the top surface of the tube-shaped wound body 111, as shown in FIGS. 11*a* and 11*b*. In this case, guides 11*c* and 11*d* are formed in the form of steps at respective lower surfaces of the outer and inner rings 11*a* and 11*b*.

Figure 12A:
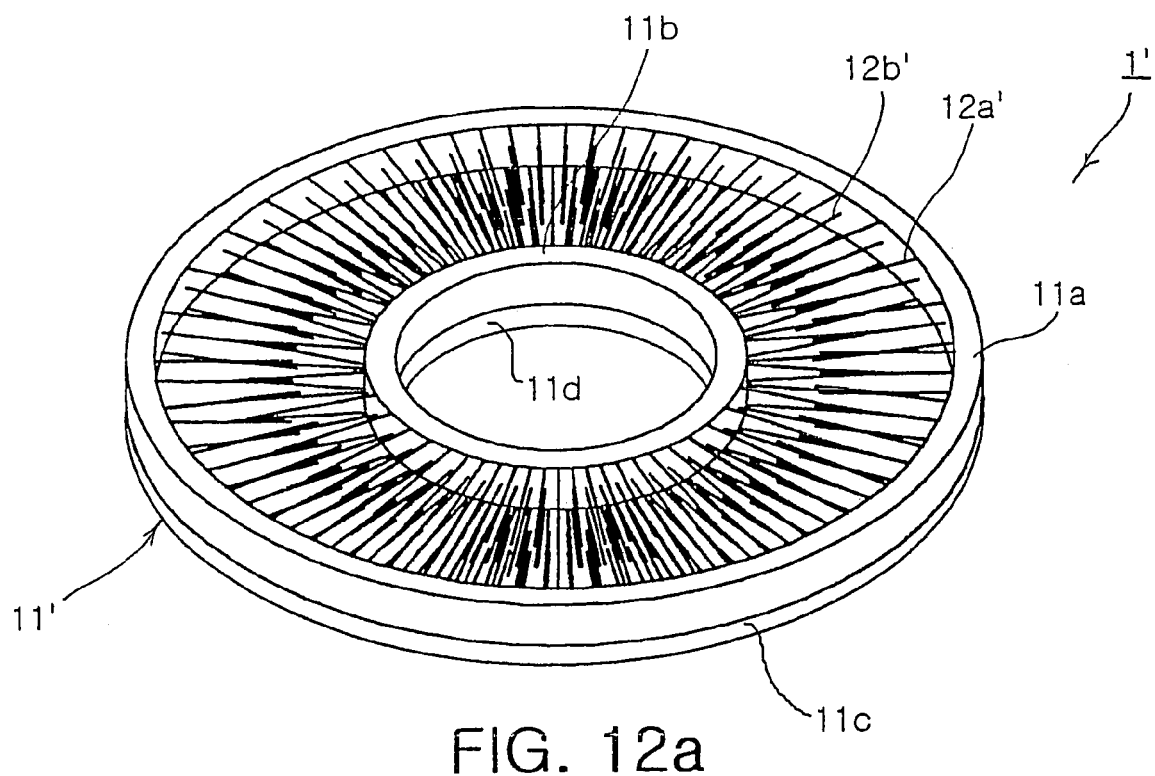
FIGS. 12a to 12c illustrate another modification of the second embodiment of the present invention, respectively.
Figure 12B:
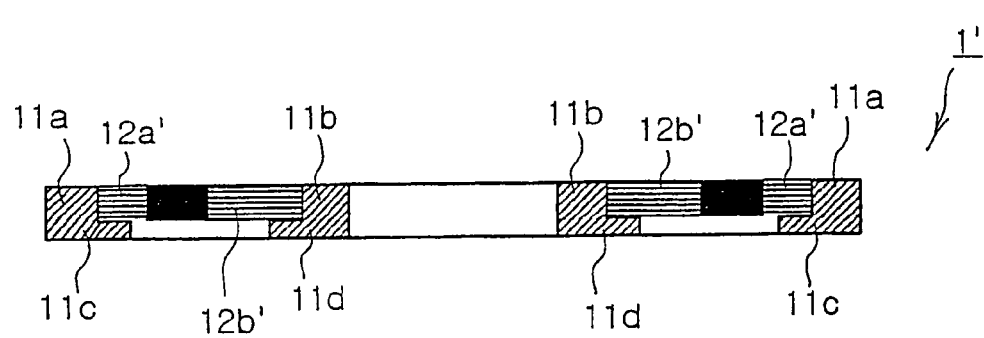

The welding wire tangling-prevention device 1' according to the second embodiment of the present invention may have a configuration in which a plurality of comb teeth 12*a*' and 12*b*' having a thin brush structure are alternately arranged, as shown in FIGS. 12*a* and 12*b*. In this case, guides 11*c* and 11*d* are formed in the form of steps at respective lower surfaces of the outer and inner rings 11.

Figure 12C:
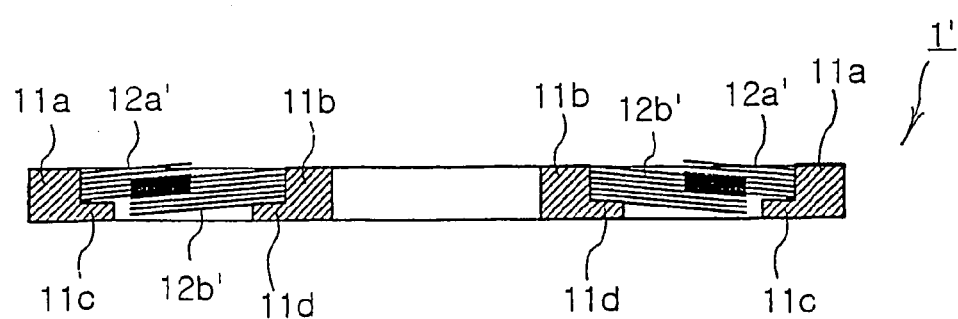

Also, the comb teeth 12*a*' and 12*b*' may be alternately arranged while being inclined by a desired angle, as shown in FIG. 12*c*.

Figure 13A:
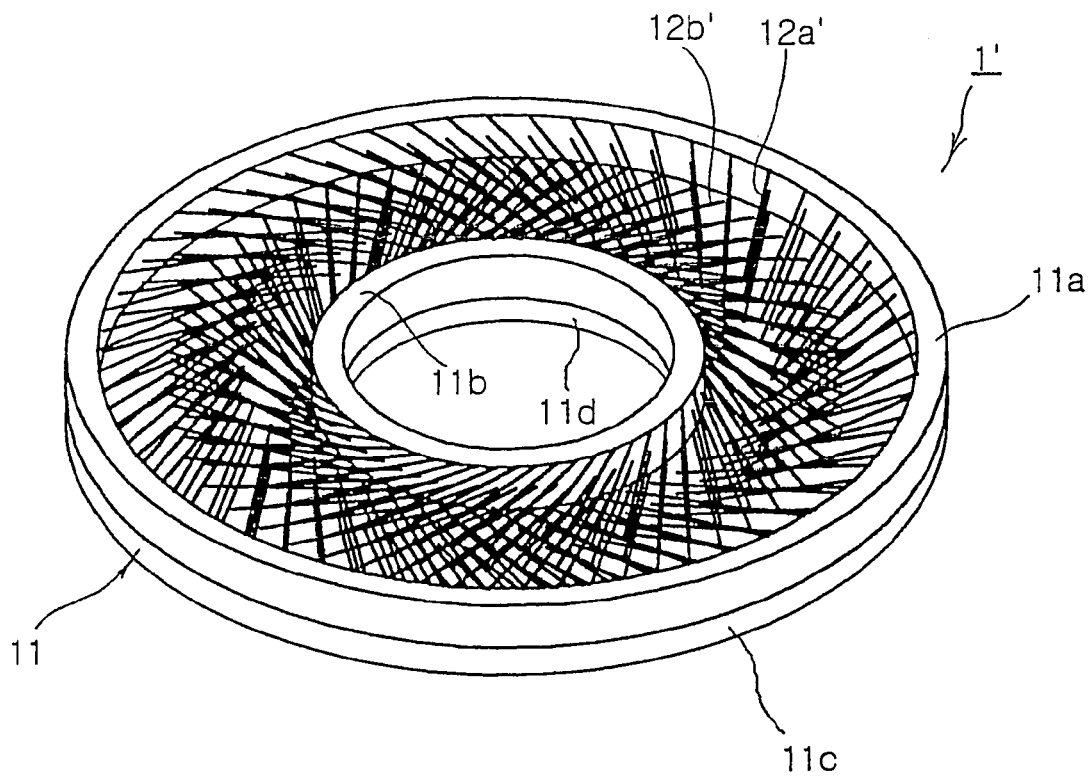
FIGS. 13a to 13c illustrate another modification of the second embodiment of the present invention, respectively.
Figure 13B:
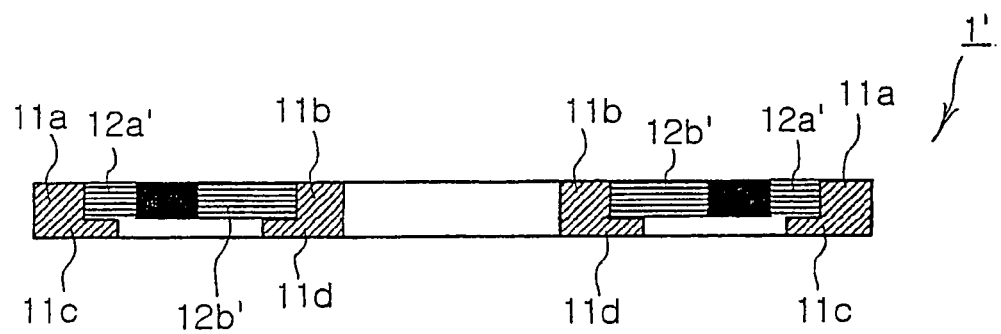
Figure 13C:
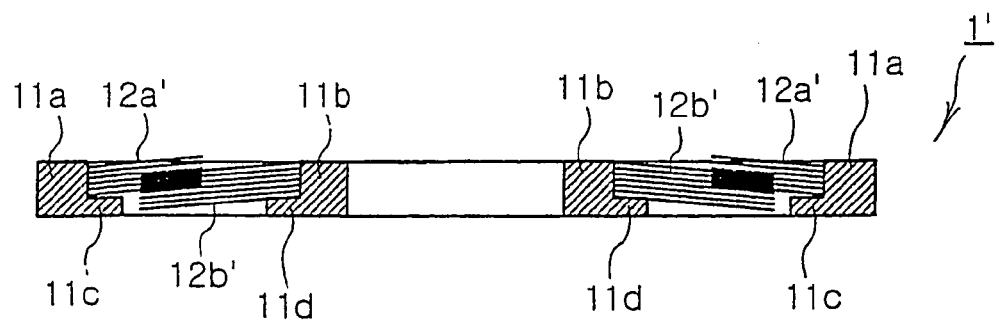

Referring to FIGS. 13*a* and 13*b*, a modification from the second embodiment of the present invention is illustrated. In this case, a plurality of comb teeth 12*a*' and 12*b*' having a thin brush structure are alternately arranged while forming a desired acute angle in the drawing direction of the welding wire 110 with respect to respective outer and inner rings 11*a* and 11*b*, as shown in FIGS. 13*a* and 13*b*. In this case, guides 11*c* and 11*d* are formed in the form of steps at respective lower surfaces of the outer and inner rings 11*a* and 11*b*. Also, the comb teeth 12*a*' and 12*b*', which have a thin brush structure, may be alternately arranged while being inclined by a desired angle, as shown in FIG. 13*c*.

As shown in FIGS. 9*a* to 13*c*, the guide members 11*c* and 11*d* provided in accordance with the second embodiment of the present invention form annular steps extending from respective lower surfaces of the outer and inner rings 11*a* and 11*b* by a desired length between the outer and inner rings 11*a* and 11*b*. Accordingly, the guides 11*c* and 11*d* prevent the loops of the welding wire 110 from being outwardly protruded near the circumferential surfaces of the outer and inner rings 11*a* and 11*b* between the comb teeth 12*a* and 12*b* (or 12*a*' and 12*b*') as the welding wire 110 comes into contact with those outer and inner rings 11*a* and 11*b* in an excessively pressed state.

The guides 11*c* and 11*d* cause the welding wire 110 to be drawn while approaching the free ends of the comb teeth 12*a* and 12*b* (or 12*a*' and 12*b*') coming into contact therewith, thereby minimizing the drawing resistance of the welding wire 110 to those comb teeth 12*a* and 12*b* (or 12*a*' and 12*b*').

Figure 14A:
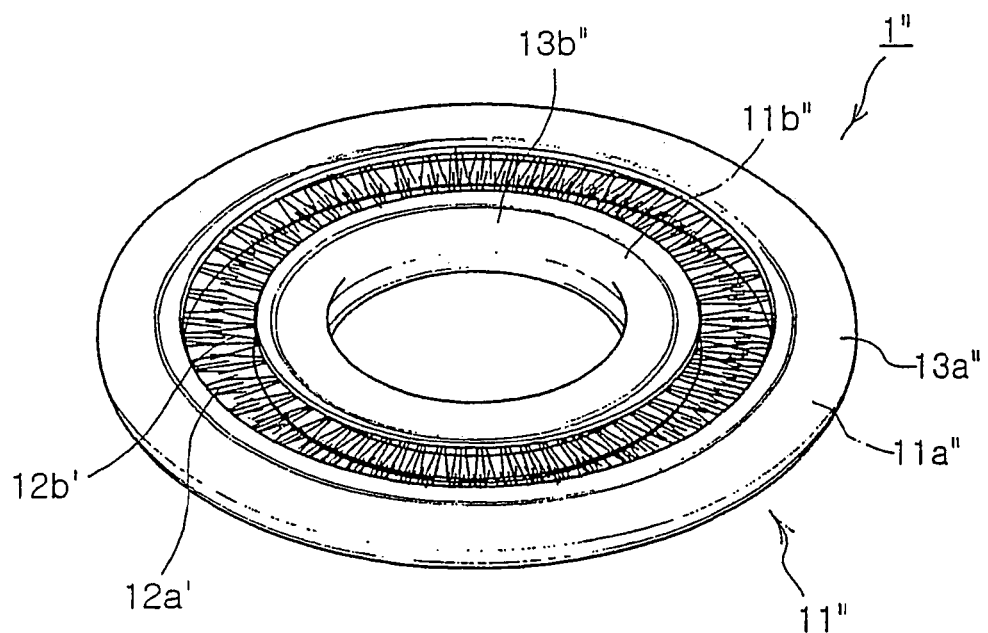
FIGS. 14a and 14b illustrate a welding wire tangling-prevention device according to a third embodiment of the present invention, respectively.
Figure 14B:
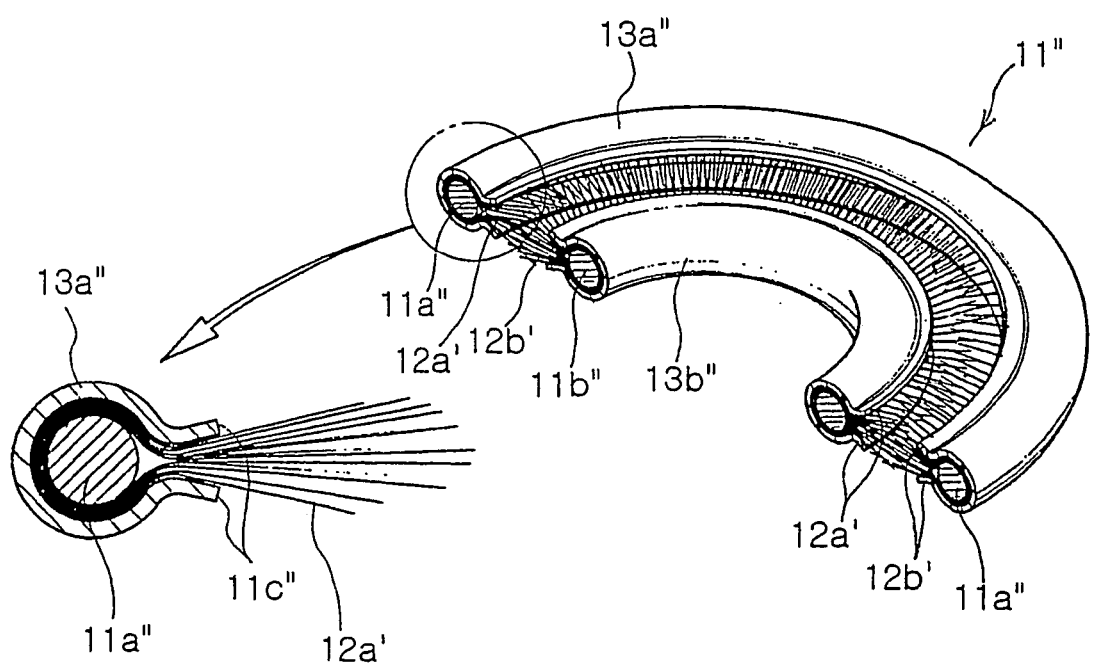
Figure 15:
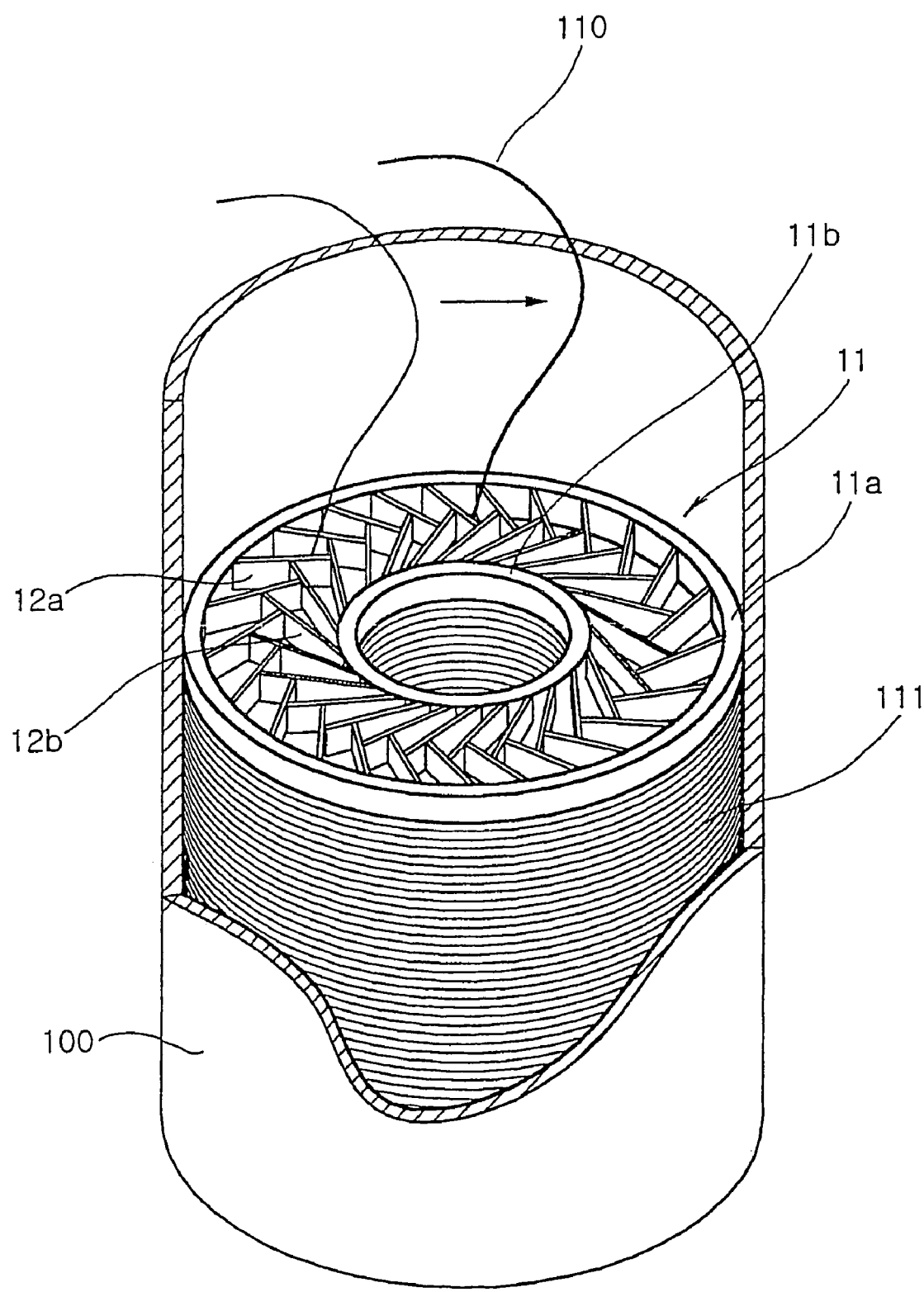
FIG. 15 is a view illustrating the operation of the welding wire tangling prevention device according to the present invention to draw out the welding wire.

Referring to FIGS. 14*a* and 14*b*, a welding wire tangling-prevention device according to a third embodiment of the present invention is illustrated.

As shown in FIGS. 14*a* and 14*b*, the welding wire tangling-prevention device, which is denoted by the reference numeral 1", includes a ring member 11" laid on the top of the tube-shaped wound body 111. The ring member 11" includes an outer ring 11*a*" having an outer diameter smaller than the inner diameter of the large-capacity pail pack 100, and an inner ring 11*b*" having an outer diameter smaller than the inner diameter of the outer ring 11*a*". The ring member 11" also includes covers 13*a*" and 13*b*" respectively surrounding the outer and inner rings 11*a*" and 11*b*".

A plurality of comb teeth 12*a*' having a thin brush structure are interposed between the outer ring 11*a*" and the cover 13*a*". The comb teeth 12*a*' having a thin brush structure surround the outer ring 11*a*" while being surrounded by the cover 13*a*" so that they are tightly interposed between the outer ring 11*a*" and the cover 13*a*". Each of the comb teeth 12*a*" extends, at both ends thereof, from the inner circumferential portion of the outer ring 11*a*" toward the inner ring 11*b*" though an annular opening formed at the inner circumferential portion of the cover 13*a*".

Similarly, a plurality of comb teeth 12*b*' having a thin brush structure are interposed between the inner ring 11*b*" and the cover 13*b*". Like the above comb teeth 12*a*', the comb teeth 12*b*' having a thin brush structure surround the inner ring 11*b*" while being surrounded by the cover 13*b*" so that they are tightly interposed between the inner ring 11*b*" and the cover 13*b*". Each of the comb teeth 12*b*" extends, at both ends thereof, from the outer circumferential portion of the inner ring 11*b*" toward the outer ring 11*a*" though an annular opening formed at the outer circumferential portion of the cover 13*b*". Preferably, the length of each comb 12*a*' is slightly longer than the length of each comb 12*b*".

The welding wire tangling-prevention device also includes guides 11*c*" and 11*d*" for minimizing the drawing resistance of the welding wire 110 drawn between the comb teeth 12*a*' and 12*b*'. The guides 11*c*" and 11*d*" comprise lips respectively protruded from the covers 13*a*" and 13*b*" of the outer and inner rings 11*a*" and 11*b*" around the openings provided at the covers 13*a*" and 13*b*" along the comb teeth 12*a*' and 12*b*'.

The lip of each guide 11*c*" or 11*d*" has a pair of lip portions gradually spaced apart from each other while extending from the associated cover 13*a*" or 13*b*" along the associated comb teeth 12*a*' or 12*b*'. Since the guides 11*c*" and 11*d*" have such an extended structure, they do not serve to hold the comb teeth 12*a*' and 12*b*' in position. The holding of the comb teeth 12*a*' and 12*b*' in position is achieved by the covers 13*a*" and 13*b*" covering the outer and inner rings 11*a*" and 11*b*", respectively.

When the welding wire 110 is drawn out, the guides 11*c*" and 11*d*" guide the comb teeth 12*a*' and 12*b*' to face each other without resisting the motion of the comb teeth 12*a*' and 12*b*' while preventing the loops of the welding wire 110 from being outwardly protruded near the circumferential surfaces of the outer and inner rings 11*a*" and 11*b*" between the comb teeth 12*a*' and 12*b*'.

By virtue of the guides 11*c*" and 11*d*", the welding wire 110 is drawn while approaching the free ends of the comb teeth 12*a*' and 12*b*' coming into contact therewith, thereby minimizing the drawing resistance of the welding wire 110 to those comb teeth 12*a*' and 12*b*'.

In accordance with the third embodiment of the present invention, the outer and inner rings 11*a*" and 11*b*", the covers 13*a*" and 13*b*", and the comb teeth 12*a*' and 12*b*' are preferably made of iron, so that they can be more easily manufactured. Also, the welding wire tangling-prevention device of this embodiment more strongly presses the tube-shaped wound body 111 in the pail pack 100 by its increased weight, thereby more effectively preventing the subsequent loops of the welding wire 110 from being lifted or drawn to be tangled. Thus, the welding process can be more conveniently carried out.

Furthermore, the welding wire tangling-prevention device 1" according to the third embodiment of the present invention may be applicable to the structure in which the comb teeth 12*a*' and 12*b*" are alternately arranged while being inclined by a desired angle θ between the outer ring 11*a* and the inner ring 11*b*, as shown in FIG. 7*c*. The welding wire tangling-prevention device 1" may also be applicable to the structure in which the comb teeth 12a' and 12b' may be alternately arranged while forming a desired acute angle in the drawing direction of the welding wire 110 with respect to respective outer and inner rings 11a and lib, as shown in FIGS. 8a to 8c. In either case, the same effects as described above are obtained.

The welding wire tangling-prevention device 1" according to the third embodiment of the present invention may include a plurality of fitting members (not shown) in place of the covers 13a" and 13b". In this case, the outer and inner rings 11a" and 11b" may have a square or rectangular cross section. The comb teeth 12a' and 12b' are wound around the outer and inner rings 11a" and 11b". In this state, the fitting members having a dimension slightly larger than that of the outer rings 11" are fitted around the outer rings 11a", so that the comb teeth 12a' are firmly held between the outer rings 11a' and the fitting members fitted around the outer rings 11a'. Similarly, the fitting members having a dimension slightly larger than that of the inner rings 11b" are fitted around the inner rings 11b", so that the comb teeth 12b' are firmly held between the inner rings 11b' and the fitting members fitted around the inner rings 11b'.

Although such modifications have not been shown in the drawings, they may be readily appreciated by those skilled in the art.

Figure 16:
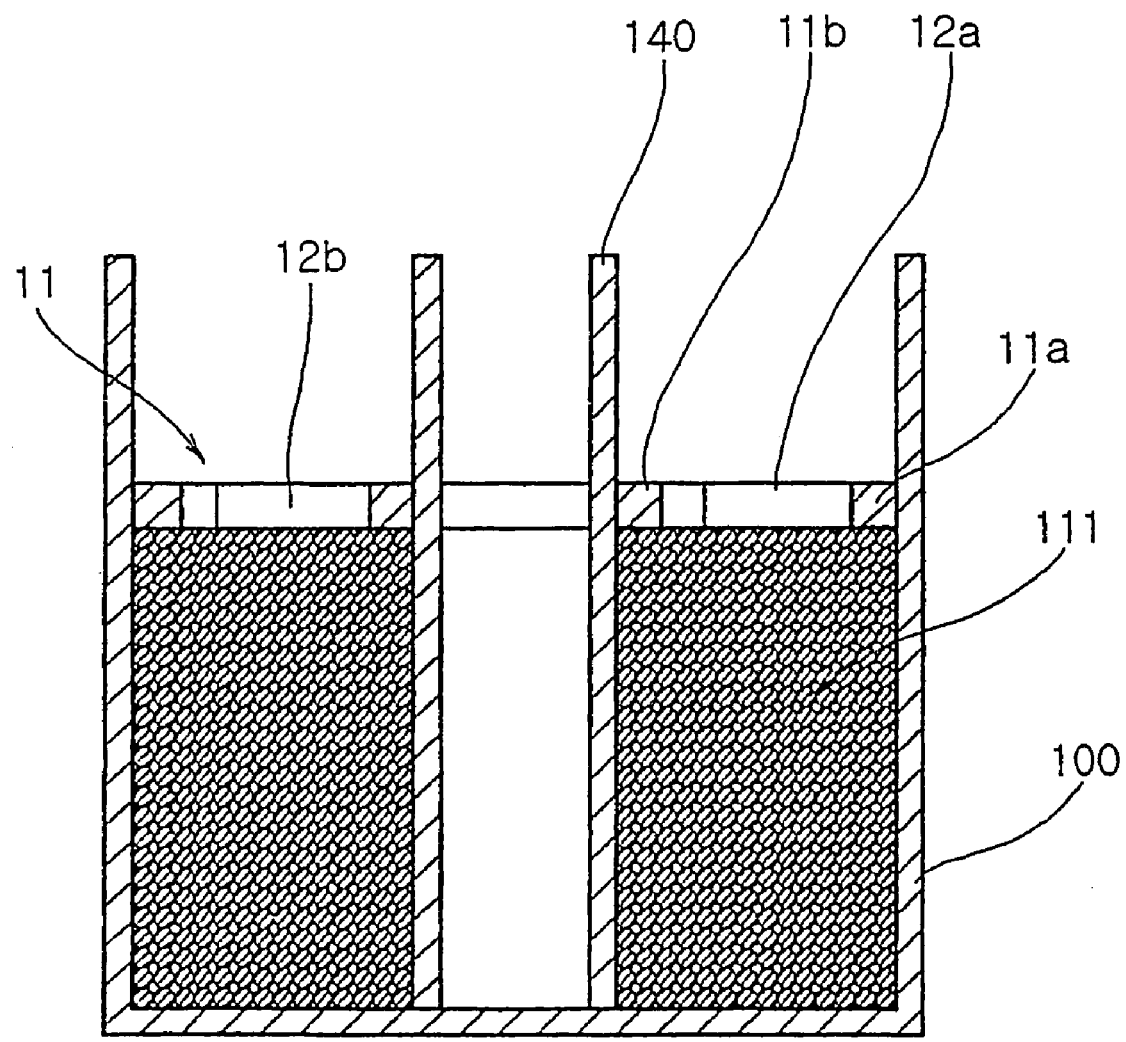
FIG. 16 is a sectional view schematically illustrating an application of the welding wire tangling prevention device of the present invention to a pail pack using an inner pipe.

Also, the welding wire tangling-prevention device of the present invention may be applied to both the case in which the wound body 111 is received in the pail pack 100 without using any inner pipe and the case in which the wound body 111 is received in the pail pack 100 using an inner pipe 140, as shown in FIG. 16.

In accordance with the first embodiment of the present invention, the welding wire tangling-prevention device includes the ring member 11 as a means for controlling the welding wire from being tangled while being drawn out from the pail pack. By the comb teeth 12a and 12b included in the ring member 11, it is possible to prevent subsequent welding wire loops from being drawn out or lifted and tangled. Accordingly, the welding process can be conveniently and efficiently carried out.

In accordance with the second embodiment of the present invention, it is possible to prevent subsequent welding wire loops from being drawn out or lifted and tangled, by the ring member 11 and the comb teeth 12a and 12b included in the ring member 11. The guides 11c and 11d, which are formed at respective lower surfaces of the outer and inner rings 11a and 11b, serve to minimize the drawing resistance of the welding wire 110. Accordingly, the welding process can be conveniently and efficiently carried out.

In accordance with the third embodiment of the present invention, the manufacture of the welding wire tangling-prevention device can be more easily achieved. The ring member 11' and comb teeth 12a and 12b more strongly press the tube-shaped wound body 111 in the pail pack 100 by its increased weight, thereby more effectively preventing the subsequent loops of the welding wire 110 from being lifted or drawn to be tangled. Thus, the welding process can be more conveniently carried out.

The invention claimed is:

1. A welding wire tangling-prevention device for preventing tangling of a welding wire (110) received in a large-capacity pail pack (100) in the form of a vertically-extending tube-shaped wound body (111) including eccentrically-stacked continuous spiral loops, when the welding wire is drawn out from the pail pack (100), comprising:
    a ring member (11) laid on a top surface of the tube-shaped wound body (111), the ring member (11) including an outer ring (11a) having an outer diameter smaller than an inner diameter of the pail pack (100), and an inner ring (11b) having an outer diameter smaller than an inner diameter of the outer ring (11a) wherein the welding wire (110) is drawn out from the pail pack (100) and the top surface of the tube-shaped wound body (111) is lowered, thereby freely lowering the ring member (11);
    a plurality of first comb teeth (12a) extending from an inner circumferential surface of the outer ring (11a) toward the inner ring (11b); and
    a plurality of second comb teeth (12b) extending from an outer circumferential surface of the inner ring (11b) toward the outer ring (11a),
    whereby the welding wire (110) is drawn out between the first comb teeth (12a) of the outer rings (11a) and the second comb teeth (12b) of the inner rings (11b).

2. The welding wire tangling-prevention device according to claim 1, wherein the first comb teeth (12a) of the outer ring (11a) have a length smaller than that of the second comb teeth (12b) of the inner ring (11b).

3. The welding wire tangling-prevention device according to claim 1, wherein the first and second comb teeth (12a, 12b) are alternately arranged.

4. The welding wire tangling-prevention device according to claim 1, wherein each of the first and second comb teeth (12a, 12b) has a flat strip structure.

\* \* \* \* \*